United States Patent [19]

Evans et al.

[11] 4,308,185

[45] Dec. 29, 1981

[54] GRAFT POLYMER COMPOSITIONS OF TERMINATED EPOXY RESIN, PROCESSES FOR MAKING AND USING SAME, AND SUBSTRATES COATED THEREWITH

[75] Inventors: James M. Evans, Panama City, Fla.; Vincent W. Ting, Brunswick, Ohio

[73] Assignee: SCM Corporation, New York, N.Y.

[21] Appl. No.: 38,547

[22] Filed: May 14, 1979

Related U.S. Application Data

[63] Continuation of Ser. No. 793,507, May 4, 1977, abandoned, which is a continuation-in-part of Ser. No. 788,454, Apr. 18, 1977, abandoned, and Ser. No. 685,246, May 11, 1976, abandoned.

[51] Int. Cl.$^3$ .............................................. C08L 63/00
[52] U.S. Cl. .................. 260/29.2 EP; 260/18 EP; 260/29.4 UA; 260/29.6 NR; 428/418; 525/63; 525/418; 525/523; 525/530; 525/534
[58] Field of Search ................. 525/531, 418, 63, 902, 525/523; 260/29.2 EP, 29.6 NR, 29.6 TA, 29.4 UA, 18 EP

[56] References Cited

U.S. PATENT DOCUMENTS

| | | | |
|---|---|---|---|
| 3,028,359 | 4/1962 | Gaylord | 260/45.2 |
| 3,070,564 | 12/1962 | Roeser | 260/33.6 |
| 3,107,226 | 10/1963 | Tonner et al. | 260/23 |
| 3,110,695 | 11/1963 | Ceresa | 525/418 |
| 3,336,253 | 8/1967 | Wong et al. | 260/29.2 |
| 3,697,619 | 10/1972 | Nabata et al. | 260/836 |
| 3,816,557 | 6/1974 | Swanson et al. | 260/837 |
| 3,943,187 | 3/1976 | Wu | 260/837 R |
| 4,049,744 | 9/1977 | Masters | 260/837 R |

FOREIGN PATENT DOCUMENTS

956556 4/1964 United Kingdom .
1250734 10/1971 United Kingdom .

*Primary Examiner*—Theodore E. Pertilla
*Attorney, Agent, or Firm*—Irons and Sears

[57] ABSTRACT

Epoxy resin is reacted with a terminating agent to eliminate at least part of the epoxide groups of the resin and form modified resin. The epoxy resin or such modified resin is also reacted with addition polymerizable monomer at elevated temperature in the presence of at least 3% of benzoyl peroxide based on the weight of such monomer. Generally the latter reaction is done at about 110° C. to about 120° C. These two reactions can be performed in any desired sequence, or simultaneously. The final reaction mixture produced contains:

(a) graft polymer;
(b) ungrafted, modified resin; and
(c) ungrafted addition polymer, formed associatively with the graft polymer. The invention is useful for making coating compositions. The compositions have good weather resistance and are particularly useful for making sanitary coatings for cans for foods and beverages, especially for beer. The coatings compositions can be aqueous dispersions for spray application or concentrates or powders that can be made up readily into aqueous sprayable coating compositions. Organic solvent vehicles also can be used.

48 Claims, No Drawings

GRAFT POLYMER COMPOSITIONS OF TERMINATED EPOXY RESIN, PROCESSES FOR MAKING AND USING SAME, AND SUBSTRATES COATED THEREWITH

REFERENCE TO RELATED APPLICATIONS

This application is a continuation of our co-pending U.S. patent application Ser. No. 793,507, filed May 4, 1977, and now abandoned, which in turn was a continuation-in-part of two of our U.S. patent applications, Ser. No. 788,454, filed Apr. 18, 1977, and Ser. No. 685,246, filed May 11, 1976, both of which are now abandoned. Also related to this application is our co-pending U.S. patent application Ser. No. 788,611, filed Apr. 18, 1977. The contents of each of these prior applications are incorporated herein expressly by reference.

FIELD OF THE INVENTION

This invention relates to novel polymeric blends and process for making them. It is particularly concerned with coating compositions and their production, especially ones that are to be dispersed in water.

BACKGROUND

In our copending patent applications Ser. Nos. 685,246 and 788,611, identified above, coating compositions are described that comprise a compatible blend of filmforming polymeric constituents in a liquid vehicle wherein the polymeric blend is, in a preferred embodiment of the invention, an associatively-formed mixture of a carboxylic acid-functional graft polymer and carboxylic acid-functional addition copolymer. In the embodiments of the invention of our copending applications, Ser. Nos. 685,246 and 788,611, the graft polymer has an epoxy resin component that has an integral aliphatic carbon chain, onto which is grafted at aliphatic carbons thereof an addition copolymer component that contains carboxylic acid units derived from a carboxylic acid monomer, which units constitute at least 1% by weight of the graft polymer. The grafting amounts to at least 1½ parts by weight of the addition copolymer component for each 100 parts by weight of the epoxy resin component. The acid number of the blend falls in the range from about 30 to about 220.

Such copending applications Ser. No. 685,246 and Ser. No. 788,611, also describe processes for making such coating compositions. One such process involves reacting an epoxy resin with a mixture of monomers containing ethylenic unsaturation, which monomers are copolymerizable to form the addition copolymer. These materials are reacted in the presence of at least 3% of benzoyl peroxide by weight based on the weight of the mixture of monomers, at about 110° C. to about 120° C. Instead of benzoyl peroxide, any other free radical initiator may be used that furnishes equivalent free radical initiating activity for this reaction at that temperature. The epoxy resin reactant generally amounts to from 5% to 95% of the initial reaction mixture, preferably at least 50%, and for highly demanding can coating compositions, from 60% to 90%.

In those processes of Ser. No. 685,246 and Ser. No. 788,611, the presence of the unusually large amount of free radical initiator, based on the weight of polymerizable monomer, together with the strong orienting influence of the epoxy resin groups, favored the formation of a graft polymer in which the grafting was predominantly on aliphatic backbone carbon atoms of the epoxy resin. Some grafting, in minor amount, occurred at other locations as well. Grafting of other types occurred, particularly ester grafting in which carboxylic acid groups reacted with epoxy groups. Ester-type grafting is less desirable than aliphatic carbon-to-carbon grafting because the linkage is less resistant to hydrolysis and weathering.

The copending application Ser. No. 788,454 spoke of capping the epoxy resin, the term "capping" being used in a broad sense wherein some or all of the oxirane (epoxy) groups of the starting epoxy resin are eliminated. Such capping is not reversible in the sense that the word "capping" sometimes is used in connection with some other organic reactions, and the resulting "caps" cannot be removed readily to restore the original oxirane configuration. Hence the word "terminating" is believed to be better here than "capping" to describe this oxirane elimination.

The "capping" or termination can be done to oxirane (epoxy) groups on the starting epoxy resin either without extension of the starting epoxy resin molecules (eg. using benzoic acid), or with extension which might even be substantial (eg., using oxirane-terminated epoxy resin reacted with more or less of a diphenol such as bisphenol A). In such non-extension instance there are, of course, residues of the carboxylic acid projecting from where eliminated oxirane groups were; in such extension instance, the resin chain becomes generally much longer as more such diphenol reactant is used, and less long as less such diphenol is used.

SUMMARY OF THE INVENTION

In one aspect, the present invention is a process for producing coating compositions, similar to those exemplified in our copending patent application Ser. No. 685,246, and disclosed in Ser. No. 788,454, by a process which eliminates at least some oxirane groups from the epoxy resin. Thus, production of graft polymer where the grafting of addition polymer is at aliphatic carbons is favored and vagaries of oxirane (epoxy) reactions are suppressed, thereby making the production process more efficient in those respects than that of the copending applications Ser. No. 685,246 and Ser. No. 788,454. The invention is also concerned with the novel coating compositions produced by the instant process, and with their uses.

However, a more basic concern of the invention is the provision of a process for modifying graft polymer-addition polymer blends, to improve their properties, and for other purposes. This is accomplished by reacting the epoxide moieties with a chemical terminating agent, so that the blend not only will be partly free or substantially free of epoxy groups, but also possess properties imparted by the terminating agent. This may be done either before, during, or after grafting.

In one embodiment of the process of the invention, that is useful in the production of coating compositions, a preliminary terminating reaction is used, between any epoxy resin, that has aliphatic backbone carbon chains, and a chemical terminating agent, to eliminate substantially all of the epoxide groups of the resin and form modified resin. The subsequent step of the process then involves reacting this modified resin with addition polymerizable monomer in the presence of at least 3% of benzoyl peroxide by weight based on the weight of the monomer, or the free radical initating equivalent thereof. Suitable chemical terminating agents include phenols, carboxylic and other acids, amines, mercaptans, alcohols, water (all having hydrogen atoms reactable with oxirane groups) and other terminating agents also reactable with oxirane groups, eg., acyl halides, alkyl halides, ketones, Grignard reagents ($RM_gX$), cyanates, cyanoacetates, diborane, $CO_2$ and $CS_2$. Most of these need to be reacted in an operation apart from the addition polymerization, but some such as benzoic acid can be used simultaneously.

The end products of this process are reaction product mixtures similar to those of our copending application. That is, the reaction product mixture, if made with polymerizable monomer that includes an acrylic acid, contains carboxylic acid-functional graft polymer and carboxylic acid-functional addition copolymer. The graft polymer is predominantly in the configuration in which the grafting onto the epoxy resin component is at aliphatic backbone carbon atoms. These reaction product mixtures, produced in accordance with the present invention, are satisfactory as is for formulation into coating compositions.

Because of the high carboxyl content of the graft polymer and addition copolymer in such a reaction mixture, the reaction mixture is easily ionized with base such as an amine to form a stable aqueous dispersion. Whether applied in a solvent system or in an aqueous vehicle, coatings prepared in accordance with the present invention are useful for a wide variety of purposes and can be formulated to be particularly suitable for coating both two-piece and three-piece cans.

GENERAL DESCRIPTION OF THE INVENTION

The present invention is useful for the production of polymer blends and particularly, coating compositions, for application from a variety of different kinds of liquid vehicles, including organic solvent systems. The invention is generally applicable for the production of novel polymeric compositions that are useful for many film-forming applications.

In our earlier patent application, Ser. No. 685,246, identified above, we described our surprising discovery that under proper conditions, grafting can be caused to occur between an epoxy resin component and addition polymerizable monomer, generally onto aliphatic backbone carbons of the epoxy resin component. Sanitary coating compositions were made that were suitable for beverage can coating applications, by the reaction of a mixture of ethylenically unsaturated monomers that can copolymerize to form an addition copolymer in the presence of the epoxy resin and an unusually large amount of benzoyl peroxide or equivalent free radical initiator. In that process, however, a small but measurable amount of grafting occurred at other locations, and particularly, ester grafting apparently occurred, to some extent, through the reaction of carboxyl groups with epoxy groups.

The present invention provides a technique to favor grafting of the desired kind, without requiring the larger amount of free radical initiator than might otherwise be necessary. This is accomplished through the use of chemical terminating agents, that are used to eliminate substantially all of the epoxy groups of the epoxy resin, so that ester-type grafting between acid and epoxy groups cannot occur and vagaries of epoxy group reactions are eliminated. When the chemical terminating agent is properly selected, it need not be removed thereafter, since if properly selected, it will either not have a material effect on the properties of the final reaction mixture, or it will impart some desired properties.

While preliminary terminating, just described, is an important way to practice the invention, the terminating step may also be done during or after grafting. This is a useful way to control properties. For example, epoxy groups exert an important effect on the properties of polymer blends that contain them. By eliminating the epoxy groups, whether before, during, or after grafting, and whether completely or only partially, property modification can be accomplished easily and usually inexpensively.

To effect terminating in accordance with the present invention, a large number of satisfactory materials are available for use as the terminating agents, including those listed above. With monofunctional reactivity towards epoxy groups such agents do not extend the epoxy resin while eliminating such epoxy groups. With difunctionality such as in a dicarboxylic acid or diphenol, the average molecular weight of the epoxy resin can be built to terminate with a carboxylic or phenolic hydroxyl group. With a primary amine used in farily high concentration and reacted rapidly, termination can take place without extension of the epoxy resin, whereas with low amine concentration extension of the epoxy resin can be made to occur during termination.

The grafting step involves reacting an epoxy resin, which may or may not be terminated to make modified resin, with addition polymerizable monomer, that may be in the form of either a single monomer of a mixture of monomers that contain ethylenic unsaturation and that are copolymerizable to form an addition copolymer. Where the end product is to be a coating composition, and particularly where the composition is to be dispersed in an aqueous vehicle, at least one of these monomers is a carboxylic acid. The epoxy resin component and the monomer mixture are reacted together in the presence of at least 3% of benzoyl peroxide, by weight of the polymerizable monomer, at about 110° C. to about 120° C., or alternatively, any other free radical initiator can be used that furnishes equivalent free radical initiating activity in the reaction temperature range.

When such proportion of free radical initiator employed is less than the equivalent of at least 3% by weight of benzoyl peroxide, based on the polymerizable monomer, ester-type graft polymers apparently predominate (unless the epoxide groups have been terminated and thus eliminated). When such proportion of free radical initiator is sufficient to be the equivalent of at least 3% by weight of benzoyl peroxide, and up to about 7% or more by weight of benzoyl peroxide, the predominant type of grafting that occurs is at aliphatic carbons of the epoxy resin or the thus-modified epoxy resin. When a greater amount of benzoyl peroxide than about 7% is employed, or equivalent, greater expense is incurred without any particular advantage yet noted. However, amounts of free radical initiator as high as 15% equivalent of benzoyl peroxide by weight of the addition polymerizable monomer can be used.

The products produced by this invention are associatively-formed resinous blends of grafts of addition polymer to the terminated epoxy resin structure wherein such grafting is mainly to aliphatic carbon atoms of the terminated resin (usually to aliphatic backbone carbon atoms), ungrafted modified epoxy resin (i.e. an epoxy resin that has had some or all of its oxirane groups reacted with a terminating agent such as a carboxylic acid, phenol, or the like), and ungrafted addition polymer. The backbone of a starting epoxy resin is the resin other than its oxirane groups; of an epoxy resin modified by the instant termination the backbone also includes those carbons that formerly were oxirane carbons where an oxirane group has been eliminated by the termination.

The grafting forms especially durable linkages for modifying sufficient of the terminated epoxy resin present in the graft to exert a profound influence on the properties of the product blend as well as to impart lasting characteristics of the grafted-on addition polymer to the terminated epoxy resin receptor. Thus, for example, such grafted addition polymer rich in acrylic ester units would be expected to improve such receptor's resistance to outdoor exposure. Also, for example, such a graft polymer that is rich in carboxyl groups imparts to the product blend superior characteristics for making water-reduced sanitary coatings used inside beverage and like cans provided that there are a few parts by weight of grafted carboxylic acidcontaining addition polymer supplying at least about two weight parts of carboxyl units per 100 parts of starting epoxy resin. Such a blend is highly resistant to undesirable reaction in and precipitation from a mildly alkaline aqueous dispersion and the suspending influence of the ionized graft polymer in combination with associatively-formed corresponding carboxylic acid-containing copolymer on other components in such resinous blend appears to be remarkable.

However, to obtain even so modest a proportion of this durable grafting and its attendant influence upon properties of the associatively-formed blend, it is essential to commence the addition polymerization with an unusually large proportion of free radical initiation with respect to the polymerizing temperature and amount of polymerizable monomer being used, e.g. 4% or 7% or more by weight of benzoyl peroxide based on weight of such monomer when using a temperature of about 115° C. to 130° C.

DETAILED DESCRIPTION OF THE INVENTION

While the invention is particularly useful as a technique for the production of coating compositions similar to those disclosed in our copending patent applications mentioned above, the present invention is important also, for its broader aspects. For example, epoxy resins have less resistance to outdoor exposure conditions than some of the other synthetic polymeric materials. Epoxy resins are also subject to attack by some materials such as, for example, strong alkalis, or even soaps.

The present invention provides a technique for making modified polymer blends that contain graft polymers and ungrafted addition polymers, so as to improve their properties, by partly or completely eliminating the epoxy groups. Since the modification can be done prior to, during, or after the formation of the graft polymer with the proper selection of terminating agent, the invention is very versatile.

The grafting that occurs at the aliphatic backbone carbons exerts a profound influence on the properties of the reaction mixture. Thus, when the addition polymerizable monomer includes a major amount of an acrylic acid, both the graft polymer and the ungrafted addition polymer, that are produced, are carboxylic acidfunctional, and in the presence of a suitable neutralizing or ionizing agent, the reaction product may be stably dispersed in an aqueous vehicle. For satisfactory dispersion in an aqueous vehicle, the Acid Number of the reaction mixture should be sufficient for establishing and maintaining the polymer blend in the dispersion.

The effects of graft polymerization in accordance with this invention can be observed, in the case of water-reducible coatings, when there is sufficient carboxylic acid functionality so that stable dispersions are formed. There are different ways in which this can be measured. Thus, the addition polymer, when formed from an acrylic acid-containing polymerizable monomer, will contain carboxylic acid units. These—COOH units should constitute at least 2% by weight of the graft polymer, for ease of dispersion. However, when the initial reaction mixture is low in either epoxy resin or in an acrylic acid, this measurement alone may not suffice. Accordingly, it is best to couple this measurement with an Acid Number value for the entire reaction mixture, which value should be above 30 and generally will not exceed 220. A preferred range is from about 45 to about 150; a more preferred range, for sanitary coating composition binders, is 80 to 90.

Even when the initial (starting) epoxy resin reactant constitutes a major part of the reaction mixture, surprisingly little grafting may take place, while nevertheless producing a reaction mixture which is apparently profoundly influenced by the novel graft polymer. Generally, to secure the benefits of the invention, the amount of starting epoxy resin should be sufficient so that such epoxy resin constitutes at least 5% of the initial reaction mixture by weight, and preferably at least 10%. Superior binder blends are obtained when the amount of epoxy resin is 40% or more by weight of the initial reactants, and 50% or more produces preferred binders, although for sanitary coating composition binders, the amount should be from 60% to 90% starting epoxy resin.

One important feature of the process of the invention is the unusually high proportion of free radical initiator relative to addition polymerizable monomer that is used in the reaction. For practical results such proportion should be used to initiate the addition polymerization and grafting reactions rather than to use some of such proportion to finish off such reactions. If such latter addition is practiced, additional catalyst is best added. The proportion of benzoyl peroxide, used at about 110° C. to 120° C. or so must be at least 3% based on the weight of addition polymerizable monomer, and preferably is at least 4%. A useful practical preferred range is 6% to 7%, although up to 15% or more can be used. When other free radical initiators are used, the amount can be adjusted to be equivalent in activity for this particular reaction, taking the temperature of use into account.

Ester-type graft polymers apparently are formed when the polymerizable monomer includes an acrylic acid, unless prevented by eliminating oxirane groups. When the proportion of peroxide-type free radical initiator is sufficient to be the equivalent of at least 3% or more by weight based on weight of addition polymerizable monomer, of benzoyl peroxide, and of up to about 7% or more by weight of benzoyl peroxide, the predominant type of grafting that occurs with any kind of polymerizable monomer, even without terminating the epoxy resin to make modified resin, is at aliphatic backbone carbons of the epoxy resin or modified resin, and particularly, at those aliphatic carbons that have either one or two hydrogens bonded thereto in the ungrafted state. With prior terminating no acid to epoxy group ester grafting occurs, and the free radical initiator is employed to greatest effect. When a greater proportion of peroxide-type free radical initiator is employed than the equivalent of about 7% of benzoyl peroxide at 110° C. to 120° C., generally greater expense is incurred without any accompanying advantage.

While the preferred grafting reaction technique involves placing the epoxy component and a solvent for it in a reactor, and then slowly adding the monomer mixture, catalyst (i.e. free radical initiator), and solvent over a period of time that permits facility of control over the exothermic heat, other approaches to the process can be employed. For example, the epoxy resin or the modified resin and a solvent for it could be placed in a reactor, than all of the catalyst and part of the monomer mixture could be added. After an initial reaction, taking place upon heating, the remainder of the monomer mixture could be added slowly over a period of time. As a variation on this process, some of the free radical initiator might be retained for addition to the reactor along with the monomer mixture. As a further alternative, the monomer mixture, epoxy or modified resin component, and any desired solvents, could be placed in a reactor, and the catalyst added slowly.

For prior terminating, the terminating agent is reacted with the epoxy resin before the grafting reaction. For terminating at the same time as grafting, the reaction technique employed will depend on the terminating agent selected (eg. so as not to alternate the free radical initiator action appreciably).

Once the final reaction product is obtained, it is generally useful to suspend it in an aqueous vehicle, to facilitate its application as a coating composition.

The process of converting the polymeric blend containing appreciable carboxyl groups and solvent system to a stable water-borne system requires the utilization of a base or mixtures of bases. The preferred neutralizing base is dimethylethanolamine, and it is normally used at 4% to 12% by weight based on the total weight of polymer in the associatively-formed blend. For a given dispersion the proportion of base used determines the resulting viscosity of the water-borne system, which in turn affects application characteristics. Higher levels of base give higher viscosities and require larger amounts of water dilution for viscosity control.

Two different processing procedures can be used to convert the reaction product blend to a stable water-borne system. For ease of manufacture, the preferred procedure involves adding the product blend with organic solvent to a mixture of water and dimethylethanolamine, with mixing. Usually a small amount of hydrophilic solvent (ethylene glycol monobutyl ether of the like) is included in the water to aid dispersing the resin therein.

In the second procedure, water and amine are added to the product blend and solvent, with mixing. While the water-borne system prepared by this process is satisfactory as to quality, this procedure is not preferred for best equipment utilization.

Water-borne systems prepared as described above normally have a pH in the range from about 7.5 to 8.0, and have been found to be stable for storage periods of over one year. Products so produced do not change unduly in viscosity, there is little or no settling or separation, and application characteristics remain satisfactory after storage.

To operate within the most preferred ranges for practicing the present invention, for the production of sanitary coating compositions for soft drink and beer cans, the amount of starting diepoxide resin should preferably be about 80% by weight, and the amount of monomer mixture employed, for reaction with the epoxy component and by itself, should be about 20% by weight. The amount of benzoyl peroxide present during the reaction should be from about 6% to about 7% by weight based on monomers, and preferably, about 6.7% to 6.8%. The amount of methacrylic acid in the monomer mixture is reflected in the Acid Number of the final reaction product mixture that is obtained. For present purposes, this Acid Number should be in the range from 45 to 150, and preferably, from about 80 to 90, and most preferably, about 85.

For a beverage can coating composition, for use in an 80 parts of diepoxide to 20 parts of monomer mixture reaction mixture, with 1.3 parts benzoyl peroxide, a preferred monomer mixture composition is 70 parts methacrylic acid to 30 parts styrene with one wt. percent ethyl acrylate. The final reaction product mixture obtained should have all of the monomer mixture copolymerized to an addition copolymer, with parts grafted to the diepoxide resin, at aliphatic backbone carbons, and with the balance of the addition copolymer blended with the graft polymer in the reaction product mixture.

Both the graft polymer and the addition copolymer thus produced are carboxylic acid-functional. They have enough ionizable groups to be hydrophilic and are readily blendable.

Termination to eliminate epoxy groups, particularly termination without extension, would not be expected to detract appreciably from the water dispersibilty of the resulting associatively-formed blend.

Generally the reaction product mixture obtained, from the 80/20 preferred reaction mixture of starting diepoxide resin to monomer mixture, will contain up to 18½ parts of ungrafted addition copolymer. For many coating applications, even more addition copolymer can be tolerated, and separately formed compatible addition copolymer, preferably of substantially the same composition as that present, can be added, up to a total of about 40 or so parts of ungrafted addition copolymer in the reaction product mixture. Similarly, additional ungrafted diepoxide resin can be tolerated, generally up to a total of about 10% by weight of the reaction product mixture.

For aqueous dispersions at high epoxy contents, prior termination is preferred and, the carboxyl content of the reaction product mixture, measured as—COOH, should be at least 2% by weight of the reaction product mixture. For stability of dispersion, the amount may be substantially higher. The practical range is at least about 5% generally. When the carboxyl content is below about 2%, polymer blends are produced that are useful in solvent vehicles.

The several individual features of the invention will now be discussed in detail.

THE EPOXY RESIN COMPONENT

The epoxy resin component may be either an aliphatic epoxide resin or an aromatic epoxide resin. For preparing coating compositions for cans in which comestibles suitable for human consumption are preserved, the aromatic epoxy resins are preferred.

The most preferred epoxy resins are polyglycidyl ethers of bisphenol A, especially those having 1, 2- epoxy equivalency of from about 1.3 to about 2, and preferably about 2. The molecular weight of the epoxy resin used should be from about 350 to about 20,000, and preferably, for sanitary coating compositions, from about 4,000 to about 10,000. Low molecular weight epoxy resins are ordinarily selected for use when the epoxy resin content of the polymeric binder is to be low, that is, from about 10% to about 30% by weight. Low molecular weight epoxy resins, for present purposes, are considered to be those having a molecular weight of less than 1,000.

Ordinarily, when the polymeric blend is intended to contain from 50% to 90% by weight of epoxy resin based on total polymer solids, the epoxy resin selected will be one having a molecular weight in the range from about 4,000 to about 10,000, particularly for the preparation of sanitary coating compositions, for which it is preferred that the epoxy resin contribute at least 60% to total solids.

While it is sometimes convenient to use a finished epoxy resin at the desired molecular weight, it is often more practical to start with bisphenol A and the bisglycidyl ether of bisphenol A, which is available from commercial sources. The bisglycidyl ether of bisphenol A, known in the industry as liquid epoxy resin, is available in precatalyzed form not only from Dow Chemical Company under the trade name DER 333, containing as the catalyst the complex of ethyl triphenyl phosphonium acetate with acetic acid, but also from Shell Chemical Company under the trade name Epon 829, and these are convenient initial starting materials. Uncatalyzed liquid epoxy resins are also available and have been found to be suitable for use when the proper catalyst is employed.

The precatalyzed liquid epoxy resin from Dow Chemical Company, DER 333, has the following physical properties:

TABLE 1

| Properties of DER 333 Epoxy Resin | |
|---|---|
| Appearance | Clear, viscous liquid |
| Color(Gardner) | 1–2 |
| Specific gravity | 1.15 |
| Weight per gallon | 9.65 |
| Nonvolatile by weight | 96 + 190 |
| Volatile | Xylene |
| Nonvolatile by volume | 95% avg. |
| Viscosity at 25° C. | 2300–4600 cps. |
| Epoxide equivalent weight* | 199–202 |

*Epoxide equivalent weight is the grams of resin containing one gram equivalent weight of epoxide.

To increase the initial molecular weight of a liquid epoxy resin to a level that is more satisfactory for many coating applications, the initial liquid epoxy resin may be reacted not only with additional bisphenol A but also with other materials. Other polyfunctional aromatic alcohols can be used to make glycidyl ether and to increase molecular weight, including such materials as bis (4-hydroxyphenyl) methane; bisphenol F; 2,2-bis (4'-hydroxy-2', 2', 5', 6'-tetrachlorophenyl) propane; tetrachlorobisphenol A; 4,4-bis (hydroxyphenyl) pentanoic acid; diphenolic acid; novalacs or low molecular weight phenolformaldehyde polymers; 1,8 bis (hydroxyphenyl)pentadecane; resorcinol; 2, 2, 5, 5-tetrakis (4'-hydroxyphenyl) hexane; and others. However, the preferred material, for practical control over the process, for increasing the weight of the initial liquid epoxy resin, is phenol A.

The ratio of bisphenol A to DER 333 used to produce the most desirable molecular weight is from 65% to 66.5% by weight DER 333 and 35% to 33.5% by weight bisphenol A. The following table lists the characteristics of the finished epoxy resins:

TABLE II

| Epoxy Resin Starting Materials for Grafting | | |
|---|---|---|
| DER 333 level by wt. | 65 | 66.5 |
| Bisphenol A level by wt. | 35 | 33.5 |
| Approximate molecular wt. | 9000 | 5000 |
| % Epoxide oxygen | .4 | .6 |
| Gardner viscosity range at 40% wt. nv. in ethyleneglycol mono butyl ether | Z, -Z$_3$ | X-Z$_1$ |

The reaction conditions employed to increase the molecular weight of the liquid epoxy resin, or other low molecular weight epoxy resins, include a reaction temperature of about 175° C. and atmospheric pressure. While this rection can be conducted without a solvent, it is preferred to use ethylene glycol mono butyl ether at about 15% by weight based on total reaction charge.

For many coating applications, the epoxy resin, ordinarily a diepoxide, may have a molecular weight in the range from about 350 to about 20,000. However, for more demanding applications, particularly for applications where the end product is to be sanitary coating, epoxy resin molecular weight values in the range from about 4,000 to about 10,000 are preferred. These and other molecular weight determinations of the epoxy resin components are made by gel permeation chromatography, preferably, but any other standard technique may be employed.

Epoxy resins that are useful also can be modified with other condensates such as phenolic resins, phenols, and polyols. Typical modified epoxy resins are: epoxidized polybutadiene; glycidyl ethers formed by reacting phenol novolak resins with epichlorohydrin; 4, 4'-isopropylidenediphenolepichlorohydrin; 4, 4'-sec-butylidenediphenol-epichlorohydrin respectively reacted with one or more of the following drying oils or fatty acids: beechnut, candlenut, castor (including dehydrated), tung, coconut, corn, cottonseed, fish (refined), hempseed, linseed, oiticica, perilla, poppyseed, pumpkinseed, safflower, sesame, soybean, sunflower, tall oil, and walnut; or 4, 4'-isopropylidenediphenol-epichlorohydrin chemically treated with one or more of the following: allyl ether of mono-, di-, or trimethylol phenol; 4, 4'-isopropylidenediphenolformaldehyde; 4, 4'-sec-butylidenediphenol-formaldehyde, melamine formaldehyde, and urea-formaldehyde.

Commercial epoxy resins that have useful molecular weight values and that are suitable for use as is, without further increase in molecular weight, include DER 662, 664, 667, 668, and 669, all solid epoxy resin products of Dow Chemical Company (with calculated average molecular weights, respectively, of 1,275; 1,850; 3,600; 5,500; and 9,000): and EPON 836,1007 and 1009, all products of Shell Chemical Company (with calculated average molecular weights, respectively, of 625 (semisolid); 4,500; and 6,500).

While preferred diepoxide materials, for use in the practice of the invention, are prepared by reacting epichlorohydrin with bisphenol A, other satisfactory diepoxides include such initial materials as the following, provided the molecular weights are adjusted to the proper range:

Diepoxide 1
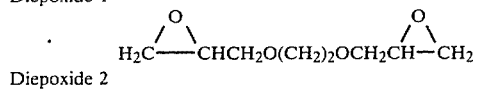

Diepoxide 2
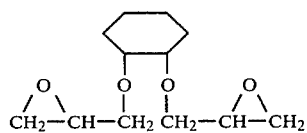

Diepoxide 3
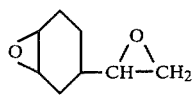

Diepoxide 4
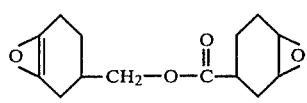

Diepoxide 5
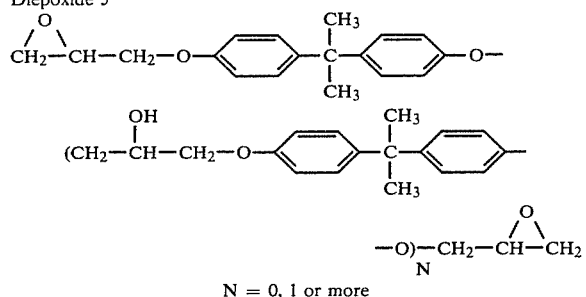

N = 0, 1 or more

A further way of characterizing the epoxy resin component is in terms of its oxirant content. This value can be anything from zero to about 8%. A zero value oxirane content would indicate that the epoxy groups have been completely reacted, as, for example, with excess bisphenol A. The epoxy groups may not be needed for applications other than for good can coatings. The oxirane content is determined in the following way.

DETERMINATION OF OXIRANE CONTENT

A sample of known weight is placed into a 50 milliliter Erlenmeyler flask, and dissolved in 10 milliliters of chlorobenzene. To the solution is added 10 milliliters of tetraethylammonium bromide solution and 2 to 3 drops of 2% crystal violet indicator solution in glacial acetic acid. The resulting solution is then titrated to blue-green end point with a standarized 0.1 N perchloric acid (HC10$_4$) using a 10 milliliter microburet. % oxirane is calulated from the following equation:

$$\% \text{ Oxirane} = \frac{(\text{ml.} \times \text{N of HC10}_4) \times 1.600}{\text{Wt. of sample in grams}}$$

The 0.1 N HC10$_4$ solution was prepared by mixing 8.5 ml. of 72% HC10$_4$ with 300 ml. of glacial acetic acid (99.5%), 20 ml. of acetic anhydride was added, and the solution was diluted to 1 liter with glacial acetic acid and allowed to stand overnight. It was then standardized against potassium acid phthalate.

The tetraethylammonium bromide solution required above was prepared by dissolving 100 g. of tetraethylammonium bromide in 400 ml. of glacial acetic acid (99.596). To neutralize basic impurities, a few drops of 2% crystal violet indicator solution was added and the solution was titrated dropwise with the standard 0.1 HC10$_4$ to the end point color change.

This determination is applicable to both the initial epoxy resin and to the reaction mixture that includes the graft polymer.

TERMINATING AGENTS

Materials that are generally useful as terminating agents for the epoxy groups have been mentioned above and include the phenols, many of the carboxylic acids, primary and secondary amines, mercaptans, alcohols, and water. While some ethylenically unsaturated terminating agents can be used, generally it is preferred to avoid materials of this kind in order to avoid possible addition polymerization reactions with the addition polymerizable monomer during grafting.

A preferred terminating agent for obtaining extension of the epoxy resin is bisphenol A. This is used very simply, particularly when terminating is done prior to grafting, in which case a molar excess of bisphenol A over epoxy resin can be used when the molecular weight of an initial liquid epoxide resin is to be increased. Thus, per slightly less than 64 weight parts of Dow DER 333 liquid resin per 36 weight parts of bisphenol A (where the modified resin reaches about $Z_{3-4}$ Gardner-Holdt viscosity at 25° C. 40% by weight resin dissolved in ethylene glycol monobutyl ether) down to about 60 parts DER 333 liquid resin per 40 parts of bisphenol A (where the modified resin like viscosity is a little above U) represent the useful range for these reactants in such terminating aromatic alcohols, that are useful for increasing the molecular weight of the liquid epoxide resin, are useful as such terminating agents. Also useful are phenol, the cresols, and the xylenols.

Saturated fatty acids and aromatic monocarboxylic acids such as benzoic are particularly useful for terminating epoxy resin "without extension", especially where they can impart desirable properties to the end product. Ordinarily the fatty acids can be used in a variety of commercial forms and need not be highly purified. However, acids such as palmitic, lauric, myristic, and stearic are very useful, in either refined form or as highly purified acids.

Generally the primary and secondary amines are satisfactory capping agents, particularly hydroxyl amines such as, for example, ethanolamine and diethanolamine. While not wishing to be bound by any particular theory, and recognizing that a large number of terminating agents are readily available, it appears that the presence of a hydrogen atom reactable with an oxirane group is preferable. It is for this reason, among others, that the tertiary amines are not considered suitable.

ADDITION POLYMERIZABLE MONOMER

Another important group of materials, for use in practicing the present invention, consists of addition polymerizable materials.

To practice the present invention in its broadest aspects, the addition polymerizable monomer, that is reacted in the presence of the epoxy resin or modified resin and the free radical initiator to form the reaction mixture including the graft polymer, may be a single monomer, or a mixture of copolymerizable monomers. The material selected will depend upon the objectives to be achieved in terms of properties and economics. Styrene is a valuable monomer, for example, because it acts as an extender and is economical. Acrylamide is interesting because it enhances a self-curing capability, whether used alone or as a part of a mixture. The acrylic acids impart carboxylic acid functionality.

Currently approved epoxy acrylic coatings for beverage can use include three or more monomers in admixture, i.e., styrene, methacrylic acid, and ethyl acrylate, and optionally, methylmethacrylate. However, very useful water-reducible coatings can be produced from mixtures of methacrylic acid and styrene, such acid normally being the major component, in order to develop sufficient acid functionality for forming stable aqueous dispersions of the resulting addition copolymer.

Generally, for making coating compositions in accordance with the present invention, the addition polymerizable monomer will be selected from classes of such monomeric materials. The selection may be a single monomer, or a mixture of such monomers that is designed to achieve some particular objective such as, for example, acid functionality.

The first class of monomers, that may be used in the preparation of coating compositions, are the acrylic acids. This category includes true acrylic acid and lower alkyl substituted acrylic acids, that is, those acids having ethylenic unsaturation in a position that is alpha, beta to a single carboxylic acid group. The preferred acrylic acid is methacrylic acid.

A second class of monomer that may be employed can be identified as including those readily commercially available monomers that have vinyl unsaturation and that do not impart ionizing functionality. This would include styrenic monomers, such as styrene, vinyl toluene, and divinyl benzene. Other suitable monomers include isoprene, conjugated butadiene, and the like.

A third class of monomers that are useful, particularly to comply with current regulations that apply to sanitary coatings for addition to a methacrylic acidstyrene mixture, are the alkyl esters of an acrylic acid, generally the lower alkyl esters, that is, those esters in which the esterifying group contains from 1 to 4 carbon atoms, and particularly, ethyl acrylate. Other useful monomers in this class include other $C_{1-15}$ alkyl acrylate esters and methacrylate esters such as, for example, propyl acrylate, isopropyl acrylate, butyl acrylate, isobutyl acrylate, tertiary butyl acrylate, pentyl acrylate, hexyl acrylate, 2-ethyl hexyl acrylate, octyl acrylate, nonyl acrylate, decyl acrylate, lauryl acrylate, osibornyl acrylate, methyl methacrylate, butyl methacrylate, isobutyl methacrylate, hexyl methacrylate, 2-ethyl hexyl methacrylate, octyl methacrylate, and nonyl methacrylate. Acrylamide and acrylonitrile are also useful, although not for foods. Advantageous addition copolymers useful in this operation are 10 to 80% of an acrylic acid, 0.1 to 30% of an alkyl acrylate, and 15 to 70% of styrene or the like, and preferably 30 to 50% of such acid, 0.5 to 20% of such ester, and 30 to 65% of such hydrocarbon.

Generally, those addition polymerizable monomers that are readily polymerizable under solution polymerization condition, typically those that contain ethylenic unsaturation, are suitable for use. This would include also acetylenically unsaturated materials such as, for example, acetylenic glycols. When a mixture of monomers is used in the production of a water-reducible coating, those monomers selected, other than an acrylic acid monomer, should copolymerize well with acrylic acid monomers, and should form copolymers that by themselves are not cross-linked at least until cured into a finished coating.

For most water-reducible coating compositions, generally the monomer mixture will contain a major proportion of an acrylic acid, and a minor proportion of a styrenic monomer, generally styrene. For those coating compositions that may come in contact with food, in general, and for the preparation of beer can coating compositions in particular, one preferred addition polymerizable monomer mixture is made from 70 parts by weight of methacrylic acid to 30 parts by weight of styrene, together with 1 wt. percent of ethyl acrylate. Another preferred monomer mixture includes methacrylic acid, styrene, and ethyl acrylate, in the approximate weight ratio of 65:34:1, respectively.

FREE RADICAL INITIATOR

The epoxy resin and the mixture of polymerizable monomer are reacted together in the presence of a free radical initiator, preferably of the peroxide type.

Many free radical initiating materials may be used, but benzoyl peroxide is preferred. Those materials that may be used generally include the materials often referred to as peroxide-type catalysts. The class of free radical initiators is generally well-known and is generally useful to some degree, including combinations of free radical initiators and activators for the free radical initiators high energy electron beams, under proper conditions. Typical practical free radical initiators that are in common use include cumene hydroperoxide, benzoyl peroxide, t-butyl perbenzoate, t-butyl peroxide, lauroyl peroxide, methyl ethyl ketone peroxide, chlorobenzoyl peroxide, and the like. Benzoyl peroxide is preferred as the free radical initiator for use in the practice of the present invention, to initiate and to conduct grafting and addition polymerization together (that is, associatively).

The amount of free radical initiating activity is important. That amount is expressed herein in terms of percentage by weight of benzoyl peroxide based on the total weight of the polymerizable monomer, or equivalent, at the temperature of use, which is generally from about 110° C. to 130° C., or so. Such proportion should be at least 3%, and preferably more than 4%, by weight of benzoyl peroxide or equivalent. Since benzoyl peroxide is an expensive material, no more should be used than is necessary to produce the desired results.

When the amount of benzoyl peroxide or equivalent used is about 3% by weight on monomers, minimum desired grafting occurs. As such proportion of free radical initiator used is increased, grafting at the aliphatic backbone carbons is favored. At a level of free radical initiator equivalent to 6% to 7% of benzoyl peroxide based on polymerizable monomer, with a reaction mixture of about 80% by weight epoxy resin to 20% polymerizable monomer by weight, the initial monomer grafts to the epoxy, onto aliphatic backbone carbons that have either one or two hydrogens bonded thereto in the ungrafted state. While grafting appears to occur at those aliphatic backbone carbons that are in positions alpha to terminal epoxy groups, where the epoxy resin has not yet been modified per the instant processing, there is some grafting, apparently, at other locations. This type of grafting can be illustrated thus:

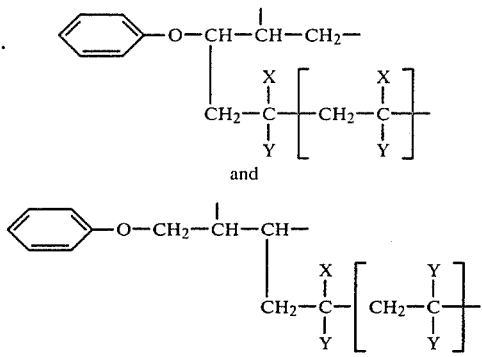

and where X is CH$_3$ or H, and Y is phenyl, CO$_2$H, or CO$_2$Et, for example.

Actually a sizable percentage of the epoxy resin may not be grafted, but the free epoxy resin is difficult to detect; it may even be as much as 50% or more of the original epoxy resin that remains ungrafted. When epoxy groups in the resulting resinous blend are eliminated by reacting them with a terminating agent to form modified resin, the foregoing grafting survives.

THE GRAFTING REACTION PROCESS

A typical grafting reaction prior to resin modification generally consists of reacting the starting epoxy resin component with polymerizable monomer that constitutes from about 5% to about 95% of the reaction mixture by weight, in the presence of a peroxide-type free radical initiator, preferably benzoyl peroxide, in an amount that is the free radical initiating equivalent of at least 3% of benzoyl peroxide by weight of the monomer. While the reaction may be conducted in the absence of a solvent, ordinarily a solvent system is employed for coating production. A preferred solvent system is one made up of two miscible solvents.

A preferred technique for conducting such reaction is to place a solution of the epoxy resin in a reactor, heat, and then slowly add, over a period of two to three hours, with mixing, the polymerizable monomer, and the free radical initiator. Since the reaction is exothermic, this technique enables the temperature to be maintained at a desired temperature and reaction rate with some degree of control. At the end of the addition to the reactor, the contents of the reactor may be maintained at a preselected holding temperature for some addition period of time, to make sure that the reaction has gone forward to the desired extent.

The particular solvents that may be employed are well-known in the art. Solvents such as xylene are satisfactory for the epoxy resin component. Other suitable solvents include benzene, ethyl benzene, toluene, and the alkoxy alkanols. For the addtion polymerizable monomer, alcohols such as methanol, ethanol, propanol, butanol, and the like, are suitable, with n-butanol being preferred. Ethylene glycol monobutyl ether, ethylene glycol monobutyl ether acetate, and the like, and hexane, mineral spirits, and the like, are also suitable. If the end product is to be used in an aqueous vehicle, then the solvents selected should be water-soluble materials.

Solvents for thinning may be introduced into the system during the initial reaction of a precatalyzed liquid epoxy resin to increase its molecular weight. For this purpose, a preferred solvent is ethylene glycol monobutyl ether, at 15% by weight based on total reactants. It is also preferred to use a mixture of ethylene glycol monobutyl ether and normal butyl alcohol at about 40/60 by ratio, for efficiency in terms of performance for can coatings. Most of the solvent is usually present to moderate viscosity and some solvent is generally added to the monomer to moderate reactivity.

The pressure during such grafting reaction ordinarily is atmospheric, but it can be higher or lower. The reaction temperature preferably is maintained in the range from about 80° C. to about 130° C., although the temperature may be adjusted within a relatively wide range to accommodate the reactivity of the mixture. Thus operating temperatures in the range from about 30° C. to about 200° C. are feasible, depending upon the end results and operating conditions selected.

As noted before, the grafting is done in conjunction with the formation of the addition polymer. The product resinous blend generally is made to have no more than about 3% oxirane content, with zero to 1% oxirane content representing a typical level.

While the use of a solvent is optional, and the reaction may go forward in the absence of solvent, ordinarily the amount of solvent may be in the range from about 5% to 30% by weight of the sum of the other components.

To conclude, conventional solution copolymerization conditions are preferably employed for such grafting reaction. The monomer and free radical initiator can be batch charged to the epoxy resin but metered addition is preferred for exotherm control. The reaction mixture is normally held for up to three hours at reaction temperature, after addition of monomer has been completed, to complete monomer conversion. When the epoxy resin is terminated with terminating agent to eliminate at least a portion of the epoxy groups, the foregoing technique is used also, although more solvent can be used if the viscosity of the modified resin is raised especially.

THE RESULTING PRODUCTS

Under the reaction conditions described, and with at least 4% and preferably 6% to 7% of benzoyl peroxide by weight of the monomer mixture, two reaction products are formed at the same time, in association with one another. This is referred to herein as associative formation.

One product, that is present in the final reaction mixture, is a graft polymer. Under the grafting conditions described, grafting takes place onto aliphatic backbone carbons of the epoxy resin, at those aliphatic backbone carbon atoms that have either one or two hydrogens bonded thereto in the ungrafted state. When the proportion of free radical initiator to copolymerizable monomer is at about 3% of benzoyl peroxide or equivalent, or below that level, the grafting at the aliphatic backbone carbon atoms is less predominant than when higher amounts are employed. Under all conditions, when the addition polymerizable monomer includes an acrylic acid, some ester-type grafting apparently may occur, particularly in the presence of an amine, but when the amount of benzoyl peroxide is above 3%, and particularly, above 6%, and such ester directing nitrogenous catalyst is not present, the amount of ester grafting that occurs becomes relatively unimportant compared to carbon-tocarbon backbone grafting.

Ester-type grafting can be almost completely eliminated, however, by terminating substantially all of the epoxide groups prior to grafting. The terminating reaction is a simple one and may involve the use of more than usual bisphenol A. The particular reaction conditions required for terminating are those that are appropriate to the particular terminating agent selected.

Whether the terminating is done prior to, during, or after grafting, in addition to the graft polymer, the reaction mixture also contains associativelyformed, ungrafted addition polymer, formed from the addition polymerizable monomer. Unreacted modified resin is difficult to detect in the reaction mixture, but up to about 10% by weight of the resin solids present in the reaction mixture may be such unreacted resin, and in some cases, particularly where the starting epoxy resin constitutes a very high percentage of weight of the total materials reacted, as much as 50% by weight may be unreacted modified resin. When the starting epoxy resin is as little as 5% of the initial reaction mixture, a higher proportion of it may be grafted, and little may be present, ungrafted, in the final reaction mixture.

The epoxy resin or modified resin may have very little grafting on it, but what is there, is important in terms of properties. It is generally preferred that there be sufficient starting epoxy resin present initially, and sufficient grafting, so that the epoxy resin component of the graft polymer constitutes at least about 5% by weight of the final reaction mixture. In the production of a resin binder blend for a sanitary coating composition for the interior of beverage cans, for example, the reaction product mixture is formed from initial reactants made up of 80 parts by weight of a diepoxide resin to about 20 parts by weight of a monomer mixture containing primarily methacrylic acid and styrene, together with a minor amount of ethyl acrylate, in a weight ratio of 65:34:1 respectively, with the reaction taking place in an ethylene glycol monobutyl ether/n-butanol solvent system in the presence of from about 6% to about 7% benzoyl peroxide by weight of the monomer mixture. Prior terminating does not seem to have a material effect of these proportions.

Because of the difficulty of separating the graft polymer from the other components of the reaction mixture, molecular weight measurements on it have been difficult to make and at best are probably only approximations. The indications are that the molecular weight of the graft polymer is in the range from about 5,000 to about 40,000.

Generally, most of such grafting is at aliphatic backbone carbons that have either one or two hydrogens bonded thereto in the ungrafted state, with or without prior terminating to eliminate epoxide groups. In other words, eliminating the epoxide groups does not seem to have a material effect, in most cases, on the desired type of grafting, although prior terminating does prevent esterification.

There are several items of evidence indicating that the graft polymer that is obtained does have the structure described. One important piece of evidence is that in the absence of prior capping, the Acid Number that would be expected to be obtained from a simple mixture of the components, is close to the Acid Number that is observed in the final reaction mixture. This indicates that there is little ester formation during grafting. In addition, the evidence obtained through the use of carbon 13 nuclear magnetic resonance spectroscopy tend to confirm as do chemical reactions with epoxy fragments (model structures).

For coating compositions, the Acid Number of the resinous reaction product mixture (excluding solvents) should be in the range from about 30 to about 220, or preferably, from about 45 to 150, and for sanitary coating compositions, such acid number should be in the range from about 80 to about 90, and preferably, close to about 85.

When benzoyl peroxide is employed at a level greater than about 3% by weight of the polymerizable monomer, free radical grafting to carbons in the aliphatic backbone chains of the epoxide resin component is favored over other types of grafting, but at the 3% level of benzoyl peroxide, little of such grafting occurs with or without prior terminating to eliminate epoxide groups. When the amount of benzoyl peroxide is increased to a preferred operating level of about 6% to 7%, optimum results in terms of production of the desired kind of grafting and economy for making good coating materials are usually attained.

WATER-REDUCIBLE COATING COMPOSITIONS

Resinous reaction mixtures prepared in accordance with this invention will contain modified resin partially or completely devoid of epoxy groups. However, the procedure for converting the reaction mixture to a dispersion in an aqueous vehicle may be the same as in our copending application Ser. No. 685,246, in some cases. If the reaction mixture has an Acid Number of 30 to 220, or preferably 45 to 150, the suspension or dispersing procedure is generally that described below (and is essentially similar to that described in such copending application). If the reaction mixture is not readily ionizable, a solvent vehicle may be required. If the terminating agent contributed to acid or basic functionality, the dispersion step may be facilitated. For the purposes of the following discussion, and to illustrate the aqueous dispersing technique, it is assumed that the reaction mixture is highly acid-functional.

To convert acid-functional reaction mixtures produced in accordance with the present invention to aqueous suspension, the techniques employed are essentially conventional. The graft polymer is dispersed in deionized water, using a fugitive base (under curing conditions for the coating) such as primary, secondary, and tertiary alkyl, alkanol, and aromatic amines and alkanolalkyl mixed amines; e.g. monoethanolamine, dimethylethanolamine, diethanolamine, triethylamine, dimethylaniline, ammonium hydroxide, or the like. Ordinarily this is done by adding an amine with some deionized water to the resinous blend and mixing vigorously while (optionally) warming, then diluting the reaction mixture with more deionized water as is desired.

The amount of water in the final dispersion depends on the viscosity desired, which, in turn, is related to the method of application. For spraying the dispersion, water amounting to about 60% by weight of the dispersion represents a typical level, within a preferred range for composition for the dispersion of from 10% to 30% by weight of resin solids and about 70% to 90% of volatiles, that is, base, water, and solvents. The base is usually about 2% to 6%, water about 30% to 90%, and the organic solvents from about zero to 40%, these percentages being by weight based on the sprayable dispersion. The solids comprise the reaction mixture solids, about 9% to 29%, and cross-linking agent, about 1% to 10%, based on the weight of sprayable dispersion.

As to applications other than spraying, the aqueous dispersion may comprise: 10% to 40% solids, which are proportioned as follows: 0.1% to 16% by weight of a cross-linking agent, and 6% to 39.9% by weight of the reaction mixture; and 60% to 90% volatile components, generally divided into organic solvent, 6% to 35%, and water, 25% to 80%. It is preferred that some organic solvent be used to facilitate application, and it is generally used in the ratio of one part by weight of solvent to about three parts by weight of water.

The organic solvent can be made up of one or more of the known solvents such as butanol (normal), 2-butoxy-ethanol-1, xylene, toluene, and other solvents. It is often preferred to use n-butanol in combination with 2-butoxy-ethanol-1, in equal amounts.

An aminoplast resin can be utilized for cross-linking with the graft polymer. It can be added to the graft polymer before neutralization and diluting, or thereafter. Typical aminoplasts include melamine, benzoguanamine, acetoguanamine, and urea resins such as urea formaldehyde. Comercially available aminoplasts which are water soluble or water dispersible for the instant purpose include Cymel 301, Cymel 303, Cymel 370, and Cymel 373 (all being products of American Cyanamid, Stamford, Conn., and being melamine based, e.g., hexamethoxymethyl melamine for Cymel 301), and Beetle 80 (products of American Cyanamid which are methylated or butylated ureas).

Other suitable aminoplast resins are of the type produced by the reaction of aldehyde and formoguanamine, ammeline, 2-chloro-4,6-diamine-1,3,5′triazine; 2-phenyl-p-oxy-4,6-diamino-1,3,5-triazine; and 2,4,6-triethyl-triamino-1,3,5-triazine. The mono-, di, or triaryl melamines, for instance, 2,4,6-triphenyltriamino-1,3,5-triazine, are preferred. Other aldehydes used to react with the amino compound to form the resinous material are crotonic aldehyde, acrolein, or compounds which generate aldehydes, such as hexamethylene-tetramine, paraldehyde, and the like.

If there is little or no oxirane functionality in the graft polymer, then a cross-linker is necessary; otherwise, it is desirable, but the graft polymer is self cross-linking with heat.

Another way to introduce cross-linking capability into the reaction mixture and the graft polymer is by utilizing as all or part of the addition polymerizable monomer, in the initial reaction mixture, a material such as acrylamide or an alkyl derivative thereof, or a material such as bis maleimide.

The coating composition of the present invention can be pigmented and/or opacified with known pigments and opacifiers. For many uses, including food uses, the preferred pigment is titanium dioxide. Generally the pigment is used in a pigment-to-binder ratio of 0.1:1 to 1:1, by weight. Thus titanium dioxide pigment can be incorporated into the composition in amounts of from about 5% to 40% by weight, based on solids in the composition.

The resulting aqueous coating composition can be applied satisfactorily by an conventional method known in the coating industry. Thus, spraying, rolling, dipping, electrodepositing, or flow coating applications can be used for both clear and pigmented films. Often spraying is preferred. After application onto the metal substrate, the coating is cured thermally at temperatures in the range from about 95° C. to about 235° C. or higher, for periods in the range from 1 to 20 minutes, such time being sufficient to effect complete curing as well as volatilizing of any fugitive component therein. Further, films may be air dried at ambient temperatures for longer periods of time.

For sheet metal substrates intended for use in the manufacture of beverage containers and particularly for carbonated beverages such as beer, the coating should be applied at a rate in the range from 0.5 to 15 milligrams of polymer coating per square inch of exposed metal surface. To attain the foregoing, the water-dispersible coating as applied can be as thick as 1/10th to 1 mil.

For a better understanding of the present invention, the following examples are provided. In this application, all parts are parts by weight, all percentages are weight percentages, and temperatures are degrees Centigrade unless otherwise expressly noted. The amine-containing aqueous dispersions of the first five examples were all stable at room temperature for long periods.

EXAMPLE 1

Terminating Prior to Grafting, Using Phenol as the Terminating Agent 877.5 grams of solid epoxy resin (DER 661), a trademark of the Dow Chemical Company, average molecular weight 1050 and oxirane oxygen (3.05%) was charged to a 5-liter, 4-neck, agitated, glass flask heated by a mantle. The flask was purged with nitrogen, and 52 grams of phenol was added thereto. Reactor contents were heated to 200° C., and this temperature was maintained for three hours. The oxirane oxygen of the resinous mixture then was determined to be 2.29%. 0.5 ml. of ethyl triphenyl phospine acetate catalyst was added to the flask to facilitate the reaction between the phenol and the epoxy resin. The temperature was maintained at 203° C. for two more hours, after which the oxirane oxygen measured 1.56%. An additional 1 ml. of said phosphine acetate catalyst was added, and the reaction was continued at 203° C. for 1.5 hours. The oxirane oxygen measurement showed no change.

254 grams of ethylene glycol monobutyl ether was added slowly to the reactor, this followed by the slow addition of 430 grams of n-butanol. The mixture was allowed to cool and stand overnight at room temperature. The reactor then was heated under nitrogen to 117° C. and held at that temperature for two hours.

In a separate vessel, a monomer mixture of 150 grams of methacrylic acid, 78 grams of styrene, 2 grams of ethyl acrylate, and 20 grams of wet benzoyl peroxide (78% BP in water; amount on dry basis=15.6 g, or 6.8% by weight based on the total weight of polymerizable monomers) was prepared in 59 grams of ethylene glycol monobutyl ether. This monomer mixture was added slowly to the agitated reactor contents over a 2-hour period while maintaining the temperature of the contents at 117° C. After the monomers were added, the reactor temperature was maintained at 117° C. for one more hour, then 33 grams of n-butanol was added.

1500 grams of the foregoing reaction product was then placed in an agitated vessel, and the following diluents were added: 1907 grams of deionized water, 108 grams of ethylene glycol monobutyl ether, and 85 grams of dimethyl ethanolamine. These last three items were added to the vessel as a neutralizing mixture calculated to produce about 70% neutralization of the carboxylic acid groups present in the reaction product. The resistivity of the deionized water was at least 50,000 ohm-cm. This addition cooled the contents of the vessel to about 50° C., and after a short time the contents of the vessel were cooled further by an addition of 313 more grams of deionized water, with mixing throughout the dilution operation.

The dispersion (emulsion) thus produced was a further water-reducible resinous coating composition having the following properties:

| Nonvolatiles | 24.3% |
|---|---|
| Viscosity (Ford No. 4 Cup at 25° C.) | 23 seconds |
| % Neutralization | 70 |
| Acid Number of composition | 95 |

The emulsion was stable and suitable for formulating into a sprayed-on sanitary coating for cans.

EXAMPLE 2

Terminating Prior to Grafting, Using A Saturated Fatty Acid As Terminating Agent An agitated reaction vessel was charged with 1289 grams of DER 661 solid epoxy resin and 466 grams of a commercially available saturated $C_{12}$ fatty acid (NEO-FAT-12, a trademark of Armour Industrial Chemical Co.). This product is regarded as a commercially pure lauric acid. The molar ratio of such acid to epoxy resin was about 2.33 to 1.22. (For complete termination, a mol ratio of at least 2.44 of this acid to 1.22 of the epoxy resin would be required.) The theoretical Acid Number of the initial reaction mixture, based on the acidity of the lauric acid, is 74.5. The progress of the reaction was monitored by observing the decrease in Acid Number. The vessel was heated to 180° C. and held at this temperature for about two hours under a nitrogen purge. The Acid Number of a sample of the mixture, taken at that point, was 12.73, and the oxirane content was 0.33%. The temperature was then increased to 195° C.

After a short period of time, the contents of the reactor were diluted by the addition of 480 grams of ethylene glycol monobutyl ether and 826 grams of n-butanol. After mixing, the diluted reaction mixture was allowed to stand overnight, with gradual loss of temperature on standing.

The diluted reaction mixture was then heated under nitrogen to a temperature between about 113° C. to about 117° C. Meanwhile, in a separate vessel, a mixture was made up of 283 grams of methacrylic acid, 148 grams of styrene, 4 grams of ethyl acrylate, 38.5 grams of wet benzoyl peroxide (78% in water, about 6.9% by weight benzoyl peroxide based on weight of polymerizable monomers) and 111 grams of ethylene glycol monobutyl ether. This mixture was added gradually to the reactor, with the reactor temperature being maintained at about 115° C. Another 62 grams of n-butanol was added, and the reactor was maintained at about 115° C. for an additional period of three hours.

At the end of that time, a quantity of 2,683 grams of the diluted reaction mixture was transferred to a large agitated vessel, and was treated with a neutralizing mixture made up of 3,411 grams of deionized water, 193 grams of ethylene glycol monobutyl ether, and 152 grams of dimethyl ethanolamine. That is calculated to give 70% neutralization. After a short period to permit equilibration, a final dilution was made by adding 560 grams of dionized water. The final dispersion had the following properties:

| Nonvolatiles | 21.8% |
|---|---|
| Viscosity (Ford No. 4 Cup at 25° C.) | 21 seconds |
| Acid Number of Final Dispersion | 22.88 |
| Acid Number of Nonvolatile Portion | 105 |

This dispersion of a reaction product made from the above partially fatty acid-terminated epoxy resin has excellent characteristics for coating applications.

EXAMPLE 3

Terminating Prior to Grafting, Using Benzoic Acid as the Terminating Agent

The starting material was a liquid epoxide resin, DER 333, that is reported by its manufacturer, Dow Chemical Company, to have an epoxide equivalent weight of 197 to 200, and a weight of about 9.65 lbs/gal. The calculated average molecular weight is 399. A reactor was charged with 1,167 grams of this low molecular weight resin, to which was added 310 grams of ethylene glycol monobutyl ether. The contents were reacted with 588 grams of bisphenol A at 150° C. to increase its molecular weight. The reaction was allowed to equilibrate at 175°–183° C. for about three hours and then was deemed to be complete, (the oxirane content was measured as 0.586%. The Gardner-Holdt viscosity was X-Y.)

To terminate the epoxy resin, 83 grams of benzoic acid was added to the reactor, along with 2 grams of benzyl dimethylamine as a catalyst for such terminating reaction. The reactor was heated to 160° C. and was then maintained at about 150° C. for three hours. At that time a sample was determined to have an oxirane content of 0.035% on nonvolatiles and an Acid Number of 8.48. Accordingly, the reaction was continued for an additional hour, after which the oxirane content was found to be 0.026%, and the Acid Number was 4.

The contents of the reactor were then diluted by the addition of 183 grams of ethylene glycol monobutyl ether and 85 grams of n-butanol. The temperature was then maintained at 118° C. under a nitrogen blanket over a two hour period, during which a monomer mixture was slowly added to the reactor. The monomer mixture was made up of 294 grams of methylacrylic acid, 154 grams of styrene, 4 grams of ethyl acrylate and 39 grams of benzoyl peroxide (approximately 8.6% by weight based on polymerizable monomer). The reaction mixture was then further diluted by the addition of 62 grams of n-butanol.

A neutralizing solution was made up of deionized water and dimethyl ethanolamine, together with about 10% weight of the mixture of ethylene glycol monobutyl ether. The neutralizing mixture was added to the diluted reaction product, with mixing, until the Acid Number of the resulting dispersion measured 21.8.

EXAMPLE 4

Low Molecular Weight Epoxy Resin Terminated with Bisphenol A Prior to Grafting

An agitated, nitrogen-purged reaction vessel was charged with 1,079 grams of the liquid epoxy resin, DER 333, 310 grams of ethylene glycol monobutyl ether, and 676 grams of bisphenol A. The contents were heated to 140° C., and the heat turned off. Temperature rose to 170° C., at which temperature the reaction was held for 5 hours. At the end of this time the oxirane content was 0.074% 701 grams of n-butanol were added and the contents were allowed to cool overnight.

The bisphenol A terminated epoxy resin was heated to 117° C. and then reacted with a monomer mixture that was added slowly to the terminated epoxy resin over a two-hour period. The monomer mixture was made up of 365 grams of methacrylic acid, 191 grams of styrene, 6 grams of ethylacrylate, 48 grams of wet benzoyl peroxide (78% BP in water or about 6.7% by weight of the dry free radical initiator based on weight of the monomer mixture) and 157 grams of ethylene glycol monobutyl ether. After this period the Acid Number of the product was 104.

A neutralizing solution of 4248 grams of deionized water, 132 grams of dimethylanolamine, and 120 grams of ethylene glycol monobutyl ether. At that point, the nonvolatile content of the emulsion was 27.1%, and the viscosity as measured by a No. 4 Ford cup at 25° C. was 105 seconds.

Upon evaluation in a sprayable coating composition for beverage cans, the dispersion was found to be quite satisfactory.

EXAMPLE 5

Production of a Powdered Product for Aqueous Dispersion

Coating compositions prepared in accordance with this invention can be applied from purely organic vehicles and from aqueous vehicles. For many coating purposes, however, it is very convenient and economical if the end product is available in the form of a readily water-dispersible powder that can be made up into an aqueous coating for spraying as needed. Some of the obvious advantages of such solid product are that it requires less space for storage and is at minimum weight for shipment. This example describes the production of such a powder product.

3 mols DER 333 resin (1200 g) was reacted with 4 mols of bisphenol A (912 g) to make a bisphenol A-terminated modified resin in the absence of solvent, using a nitrogen blanket. The reactants were charged together into an agitated reactor fitted with a trap and condenser, and the mixture was heated to 165° C. to initiate the reaction. The exothermic heat of reaction was allowed to dissipate.

The molten mass thus produced was thinned with 125 ml (100 g) methylisobutylketone to make it more readily stirrable at elevated temperatures. A measured quantity of 2212 weight parts of this slightly thinned mass was maintained with agitation at 139° C. initially while a mixture of vinyl and acrylic monomers was dripped into it. Addition of the monomers took two hours, with temperature of the mass rising to 158° C. during this time. The mass was then stirred for an additional hour. The monomers were a mixture of 30.6 weight percent (276 g) methacrylic acid, 35 weight percent (316 g) styrene, and 34.4 weight percent (311 g) ethyl acrylate, dosed with 5% by weight (45.1 g) dicumyl peroxide based on the weight of these mixed monomers.

The mass was permitted to cool and solidify, then pulverized. The Acid Number of the product was 46.3. When 40 parts of the powder were dissolved in 60 parts of 2-butoxyethanol-1, the Gardner-Holdt viscosity was X-Y and a slight haze could be observed in the solution. The pulverized product did not adhere together (block) at 120° F., but did so slightly at 135° F.

A 100 gram sample of the powdered product was mixed with 267 grams of water, 7.4 grams of dimethylethanolamine, 18 grams of hexamethoxymethylmelamine resin (Cymel 370, a product of American Cyanamid Company) and 50.6 grams of 2-butoxyethanol-1. The powdered blend dispersed well, and the resulting dispersion was thinned with 60 grams of water to give a coating product having 23.6 weight percent resin solids and Number 4 Ford Cup viscosity of 35 seconds.

This thinned dispersion had the following coating characteristics on tin-free steel and aluminum. The dispersion was spread with rods on these substrates and baked for 3 minutes at 196° C. to cure the wet films. The first rub test below had wet film thickness before cure of 1.5 mil. The second rub test below and the rest of the tests below were made on cured residues of 1.4 mil thick wet films. The cured film is about one-fifth as thick.

| Test | Tin-Free Steel | Aluminum |
| --- | --- | --- |
| Methylethylketone rubs to film rupture; 1st test | 100 | more than 120 |
| Methylethylketone rubs to film rupture; 2nd test | 55 | 70 |
| Blushing of cured coating from pasteurization treatment; 3rd test | none | none |
| Adhesion by Scotch tape method | 0 | 2 |
| 0 = no coating removed | | |
| 10 = all coating removed | | |

The aqueous dispersion was stored at 120° F. and lost very little viscosity and only a minute bit of alkalinity in a week. After about 5 weeks storage at 120° F., viscosity declined from 35 seconds to 20 seconds as measured by a Number 4 Ford Cup, but this was not considered serious because the product still remained well-dispersed and useful. It would not be expected to be stored as a wet dispersion for long periods at high temperature, particularly because ordinarily the powdered product would be stored.

EXAMPLE 6

Composition Useful for Cathodic Electrocating

Termination with Amine after Grafting 450 grams of DER 331 resin and 400 grams of ethylene glycol monobutyl ether were mixed in a reactor (4 liter, 4-neck agitated, glass flask) and heated to 100° C. under a nitrogen atmosphere.

This monomer mixture was made in a separate vessel: 1080 grams butyl acrylate, 540 grams styrene, 180 grams of hydroxy ethyl acrylate, 155 grams of 78% benzoyl peroxide in water (130 grams BP on dry basis), and 340 grams of ethylene glycol monobutyl ether.

The reactor containing the epoxy resin was heated to 118°. Then the monomer mixture was added over a 2-hour period. The temperature was held at 118° for 3 additional hours. At this stage the following properties were determined.

| | |
| --- | --- |
| Viscosity | = X (Gardner-Holdt at 25° C.) |
| Non-Volatile Matter | = 70.9% |
| Oxirane Oxygen | = 1.5% on nonvolatile matter |

In an agitated vessel 1027 grams of the above reaction product (70.9% resin in solvent) was heated to 116° C. 84 grams of diethanolamine then was added, and the temperature held at 116° C. for 1.5 hours.

The purpose of so adding the amine was to eliminate oxirane groups and produce a cathodically-attractable, modified resin paint binder useful for formulating into an aqueous painting bath for direct current cathodic electrocoating.

EXAMPLE 7

Investigation of the Grafting Mechanism

A polymeric blend is prepared by reacting an epoxy resin with an addition polymerizable monomer mixture in an 80 to 20 weight ratio, in the following manner.

First, a DER 333 liquid epoxy resin is reacted with bisphenol A in the proportion of about 65% of the resin to about 35% by weight of bisphenol A. In a separate vessel a mixture is made of methacrylic acid, styrene, and ethyl acrylate, in the weight ratio of 65 to 34 to 1, respectively. About 6.8% of benzoyl peroxide is added by weight of the mixture, and the mixture is then gradually added to the epoxy resin at a reaction temperature of about 120° C. during a two hour period. After an additional holding period of about two hours at the same elevated temperature, samples of the product are taken for structural evaluation.

Carbon 13 nuclear magnetic resonance spectroscopy indicates that most of the grafting between the addition copolymer and the epoxy resin is restricted to what had been, before the grafting aliphatic secondary (and possibly aliphatic tertiary) backbone carbon atoms of the epoxy resin backbone.

In order to delineate further such grafting, several different model compounds, each having an aliphatic carbon atom arrangement like some of those present in the epoxy resin, are reacted separately with the same mixture of monomers under conditions comparable to the grafting conditions described above. Carbon 13 nuclear magnetic resonance spectroscopy on these resulting analog products indicates that grafting on aliphatic backbone carbon atoms of the model compounds occurs practically entirely on those carbons which had been aliphatic secondary carbons alpha to oxirane groups prior to grafting. This suggests a fair likelihood of the same situation prevailing in the instant resinous blend reaction product. A small decrease is noted in the Acid Number of the reaction product, relative to the Acid Number calculated for the equivalent mass but based upon all of the methacrylic acid charged to the reactor, and this small decrease in Acid Number tends to corroborate the findings made through Carbon 13 spectroscopy.

Hence, it is concluded that while other grafting to aliphatic carbon atoms of the epoxy resin backbone may occur, the proportion is minor relative to the grafting on those aliphatic backbone carbon atoms in positions alpha to the oxirane groups and on the other aliphatic backbone carbons that have either one or two hydrogens in the ungrafted state.

The foregoing polymeric blend can be reacted with benzoic acid in the manner of Example 4 (using catalyst) to eliminate virtually all oxirane content in the graft polymer (between the epoxy resin and the copolymerizable monomers) and unreacted epoxy resin present. By so doing, the possibility of uncontrolled subsequent reaction of oxirane groups is precluded. The resinous product then can be formulated into stable aqueous compositions for coating in the manner of Example 4.

Our subsequent experience with epoxy resins that have been reacted with chemical terminating agents to eliminate epoxide groups and make modified resin preparatory to the grafting reaction with addition polymerizable monomer indicates no material difference in performance of the resulting resinous blends made up into aqueous coating compositions with amine from those wherein such termination is done after the grafting. Accordingly we conclude that the grafting to aliphatic carbon atoms in such instance is enough like that described in this Example 7 to give substantially the same practiced results.

EXAMPLE 8

Effect of Using Different Amounts of Benzoyl Peroxide

A series of resinous blends are prepared in essentially the same manner as described in Example 7, but with each addition polymerization operation using a different percentage of benzoyl peroxide free radical initiator based on the weight of the mixed monomers.

The blends are observed for their ease of dispersibility in aqueous amine solution, and the resulting aqueous dispersions are observed for their resistance to precipitation (stability) for a week. The following observations for this work are typical.

TABLE V

| Wt. % Benzoyl Peroxide based on Mixed monomers | Remarks |
| --- | --- |
| 3 | marginally dispersible, tending to separate in about a day (1) |
| 5 | very stable aqueous alkaline dispersion made readily |
| 7 | very stable aqueous alkaline dispersion made readily |
| 9 | very stable aqueous alkaline dispersion made readily |
| 15 | very stable aqueous alkaline dispersion made readily (2) |

(1) Would be considered borderline at best for sanitary coating use and most likely would require considerable extra hydrophilic organic solvent for ease of aqueous dispersion.
(2) The high proportion of free radical initiator not only gives rise to concerns about high costs, but also concerns about the possibility of free radical initiator fragments (e.g. benzoic acid) giving rise to undesirable organoleptic and other properties, e.g. tending to produce components extractable into beverages, various low mol weight substances, etc.

The foregoing polymeric blends can be reacted with benzoic acid in the manner of Example 4 (using catalyst) to eliminate virtually all oxirane content in the graft polymer (between the epoxy resin and the copolymerizable monomers) and unreacted epoxy resin present. By so doing the possibility of uncontrolled subsequent reaction of oxirane groups is precluded. The product can be formulated into a stable aqueous composition for coating in the manner of Example 4.

EXAMPLE 9

Terminating Prior to Grafting Using Bisphenol A as the Terminating Agent 921 grams of liquid epoxy resin (DER 333, average M. W.=399) and 591 grams of bisphenol A were charged to a 5-liter 4-neck reactor flask placed in a heating mantle. The flask was then heated until the temperature of the reactants reached 150° C., at which point the heat was turned off. The reaction temperature continued to rise to 187° C. which was maintained for one hour. The oxirane oxygen of the reaction mixture then was measured at 0.048%. 582 grams of ethylene glycol monobutyl ether was added slowly to the reaction mixture followed by the slow addition of 872 grams of n-butanol. The reaction mixture comprising the bisphenol A terminated epoxy was allowed to cool to 120° C.

In a separate vessel the following monomer mixture was made: 282 grams of methacrylic acid, 173 grams of styrene, 193 grams of ethyl acrylate, and 44 grams of benzoyl peroxide (about 6.8% by weight based on the weight of monomers). This monomer mixture was added to the reactor containing the bisphenol A terminated epoxy over a two hour period while maintaining the temperature at 120° C. The entire contents were maintained at 120° C. for an additional three hours with mixing after which the Acid Number was determined as 91.

3169 grams of the reaction mixture was placed in a large stirred vessel and heated to 100° C., at which point 3824 grams of deionized water and 207 grams of dimethylethanolamine were added. The neutralizing ingredient was proportioned to provide about 80% neutralization. The contents were maintained at 100° C. for one hour, then cooled with the addition of 1800 grams of additional deionized water. The neutralized dispersion was allowed to stand at room temperature overnight.

The dispersion thus produced was a resinous sanitary coating composition for beverage cans having the following properties:
Nonvolatiles: 20%
Viscosity (Ford No. 4 Cup at 25° C.): 14 sec.
pH: 7.4
% Neutralization: 80%

Such dispersion showed no measurable change in viscosity or pH even after storage at 49° C. for a period of two weeks, and dispersion stability was shown by no precipitation in this period.

GENERAL COMMENTS

To sum up, this invention provides associatively-formed resinous blends of ungrafted epoxy resin that has been modified to eliminate at least a part of its epoxide groups, ungrafted addition polymer, and grafts of addition polymer onto the modified resin structure wherein such grafting is restricted mainly to what were, before such grafting, aliphatic secondary (and possibly aliphatic tertiary) carbon atoms of the epoxy resin or modified resin aliphatic carbon backbone.

This grafting provides an especially durable linkage for further redesigning the epoxy resin so as to exert a profound influence on the properties of the resinous blend product as well as to impart lasting characteristics of the grafted-on addition polymer to the epoxy resin or modified resin receptor. Thus, for example, such a graft polymer that is rich in carboxyl groups imparts to the resinous blend product superior characteristics for making water-reduced sanitary coatings used inside cans for beverages and the like, provided that there are a few parts by weight of grafted carboxylic acid-containing addition polymer supplying at least about one weight part of carboxyl groups per 100 parts of starting epoxy resin. Such a blend is highly resistant to undesirable reaction in and precipitation from mildly alkaline aqueous dispersion.

To obtain even so modest a proportion of this durable grafting and attendant influence upon properties of the associatively-formed blend, it is essential to commence the addition polymerization with an unusually large amount of free radical initiation relative to the polymerizing temperature and amount of polymerizable monomer being used, e.g., from 4% to 7% or more by weight of benzoyl peroxide based on weight of such monomer when reacting at a temperature about 115° C. to about 125° C.

In its preferred embodiments, then, this invention is primarily concerned with the production of resinous compositions that are intended for use in coating cans for items for human consumption, and particularly, for soft drinks and beer. There are several tests that are applied in order to determine whether a particular coating composition is satisfactory for these surprisingly demanding end uses. Some of the more important tests are described briefly below. Whenever a coating composition has been indicated in this application to be acceptable for use as a sanitary coating composition, it can pass many of these tests.

The Flavor Test. The cured coating in the can should impart no discernible flavor to the contents of the can, nor should it alter the flavor of the can contents in any way. This test is particularly important with respect to beer can coatings.

Adhesion. The adhesion test is conducted at room temperature under ambient humidity conditions. The coating panel to be tested is cross-hatched by cutting three parallel lines, each approximately 1" long, about ⅛" apart. These lines are intersected at 90° with three identical lines similarly spaced. Usually a knife edge or razor blade is used to cut the lines. A strip of Scotch cellophane tape is then firmly pressed diagonally across the scribed squares. The tape is pulled off with a quick continuous pull, using a peeling-back motion at an angle of pull of about 150°. The cross-hatched area of the panel is then inspected for removal of coating. If any coating is removed, the percentage is recorded as a numerical rating in the range of zero to 10. A zero rating indicates a perfect score, with no removal, and a 10 rating indicates 100% removal.

Storage Stability. Water reducible coating must demonstrate acceptable hydrolytic stability on extended storage. This is determined by making an initial measurement of all of the properties of the coating composition and then redetermining them after a period of storage, on samples stored not only at room temperature but also at 50° C. Some of the most significant parameters, with respect to stability, are freedom from gelation, freedom from precipitation, and freedom from changes in pH. To be acceptable as a sanitary coating composition, there should be little discernible change in viscosity after room temperature storage for 12 months or after storage at 50° C. for 8 months, indicating the absence of gelation.

Thermal Stability. In some can manufacturing processes, after the coating has been applied, the coated metal is dipped in a solder bath at a temperature in the range from about 340° C. to 370° C. for a period up to about 5 seconds. The amount of discoloration of the coating is an indication of the extent of decomposition. In other can fabricating operations, where use is made of ends that are die-stamped, the assembled cans are usually immersed in a bath of acidic copper sulfate for 5 minutes, to test for any cracking in the coating during the fabrication. The presence of a crack will be indicated by the deposition of a small amount of copper on the metal of the can.

Water Pasteurization Test. This test is often performed on cured coatings that have been sprayed and baked on the interiors of two-piece aluminum cans for beverages. The test is also used to measure the resistance of a coating material to water and to water vapor at pasteurization temperature. For test purposes, the coating weight is from 12 to 16 milligrams per 4 square inches of panel. After the coating has been applied and cured by baking for about 2 minutes at about 218° C. (390° F.), two test strips are cut from the coated panel, each approximately 1½"×9". The top 2" of each test strip is bent back upon itself, with the coated side exposed. Each test strip is then half-immersed in a water bath at about 94° C. (170° F.) by handling each strip over the edge of the water bath. After immersion for ½ hour, the strips are cooled under running tap water at room temperature, dried, and examined immediately for blush and for adhesion.

Any blush (whitening) indicates the absorption of water during pasteurization and is rated on a scale from zero to 10, zero being perfect and indicating no blush, and 10 indicating complete whitening. Both the immersed area and the area exposed only to water vapor are rated. A blush rating range of zero to 2 is acceptable.

The adhesion test, as described above, is applied to both the immersed area and the water vapor exposed area, and is rated accordingly, again on a scale of zero to 10. Coating removal from a test strip in the range from zero to 1 is acceptable.

Enamel Rater Test. This is a test employed by canners, to evaluate metal exposure in coated cans. Under the conditions of the test, a low voltage is applied between an electrode that is immersed in an electrolyte-filled can, and the can body. When the coating on the can is imperfect, metal is exposed and current flows. The flow of current is indicated on a meter, and the magnitude of the current is related to the total area of metal that is exposed to the electrolyte. Thus, the size of the current flow, as indicated by the reading on the milliammeter, provides a relative measure of the total metal exposure. Generally, each canner has his own specification as to the permissable current flow.

The conditions of the test involve the use of a standardized electrolyte, and a coating weight of 2.5 mgs. per square inch. For a 12 ounce beverage can, this coating weight is approximately 110 to 120 mgs. per can. Under the usual test conditions, a current flow rate below 25 milliamperes is acceptable for aluminum beer cans, for many brewers.

The requirements for soft drink cans are more stringent and the normal requirement for aluminum soft drink cans in production is a current flow rate of less than 5 milliamperes. Accordingly, higher coating weights are normally applied to coatings for soft drink cans, normally about 4.5 mgs./in.$^2$, which amounts to about 160 to 200 mgs. for a 12-ounce soft drink can.

The following characteristics are also often evaluated for sprayable coating compositions for two-piece cans.

Wetting. The composition on the coated surface must have the ability to form a continuous wet film. This is a particularly critical requirement with respect to the lower wall area of two-piece cans because this is where the can is farthest from the spray gun.

Blister Resistance. Some applications, such as single coats for two-piece tin plated cans, require high coating weights. Normally the highest wet film concentration will occur in the moat area. Because of the great thickness of the film in this area, there is a tendency to blister, which is a disruption of the film surface by volatilization of liquid.

Foaming. When applied by an airless spray by 1,000 psi, the coating must not foam on the can. When foaming occurs, it causes film discontinuity and a rough surface.

CONCLUSION

Water dispersion sanitary coating compositions made in accordance with embodiments of this invention can pass many of the tests mentioned above. Such compositions perform exceptionally well when sprayed by both air and airless devices. Excellent atomization can be obtained regardless of the type of nozzle or pressure, that is, excellent spraying applications can be obtained at pressures in the range from 2 psi up to 1500 psi.

Coating materials made in accordance with the invention have been applied to tin plate, aluminum, to metal coated with primers, to plastics made from ABS, polyolefins, polyesters, polyamides, and the like, in a range of application thicknesses producing cured weights per 12-ounce can in the range from 1 to 10 mgs/in, which is 50 to 300 mgs. per 12-ounce can. Film continuity generally has been excellent throughout this range.

Moreover, these compositions have excellent application properties and generally their use is free from problems with respect to blistering, sagging, solvent washing, foaming, and excess flow. It is common with water-reducible coatings to encounter odor problems in the spraying equipment, but no such problems have been encountered with compositions prepared in accordance with this invention.

While the specific examples demonstrate, generally, preferred embodiments of the invention, other preferred embodiments and practices also lead to excellent coating compositions. Thus, if the procedure of Ex. 3 is followed, and then diluent addition copolymer made by the addition copolymerization of the same monomer mixture as used in that example, is added to the reaction product mixture, quite satisfactory coatings can be obtained, generally at lower cost, up to addition levels yielding an ungrafted total of about 40% of addition polymer based on the mixture, and even more may be tolerated. Similar results are obtained when the only diluent used is added epoxy resin, i.e., when there is no addition to the reaction mixture of separately polymerized addition copolymer. However, any addition of epoxy resin generally is for properties rather than for economy. Both epoxy resin and separately formed addition polymer may be added, however, for a combination of property modification and economy.

While the compositions described generally have been those using liquid vehicles, the binders may be prepared in the absence of solvents, cooled, and pulverized to form powdered products, as in Example 5. These powdered products can be dissolved in solvent vehicles, and can be dispersed in aqueous vehicles if some amine is added at the time of use. Concentrates may also be useful, for economical shipping.

The amount of the preferred free radical initiator, benzoyl peroxide, has been expressed in terms of percentage base on weight of the addition polymerizable monomer. Based on the entire reaction mixture, it is preferred that the amount be in the range from not below 0.6% to not above 5%.

While the invention has been disclosed by reference to the details of preferred embodiments thereof, it is to be understood that such disclosure is intended in an illustrative, rather than in a limiting sense, and it is contemplated that various modifications in the compositions and processing techniques, in particular, will readily occur to those skilled in the art, within the spirit of the invention and the scope of the appended claims.

What is claimed is:

1. A process for preparing an ionizable resinous reaction product that is dispersible in an aqueous ionizing medium which comprises, in either order or simultaneously,
    (a) reacting an aromatic 1,2-epoxy diepoxide resin having an oxirane content of from 0% to 8%, and that has aliphatic backbone carbon atoms having one or two hydrogens bonded thereto, which epoxy resin contributes at least 10% by weight to the resinous reaction, and has a molecular weight of at least 350, with a chemical terminating agent for diepoxide that reacts with the epoxy groups of the resin substantially to eliminate the epoxy groups of the resin and form modified resins;
    (b) reacting said epoxy resin with at least one monoethylenically unsaturated addition polymerizable monomer in the presence of benzoyl peroxide, in an amount of at least 3% based on the weight of said monomer, at a temperature in the range from about 110° C. to about 130° C., or under equivalent free radical initiating conditions for this reaction including the use of a peroxide initiator, and a temperature up to about 200° C., so as simultaneously to effect polymerization of the monomer through its ethylenic unsaturation and to form graft polymer with addition polymer grafted to at least some of said backbone carbon atoms by a carbon-to-carbon bond in place of a hydrogen atom that is bonded thereto in the ungrafted state.
    either said terminating agent or at least some of said monomer comprising an ionizable group, the product obtained containing a sufficient number of ionizable groups for establishing the reaction product as a dispersion in an aqueous ionizing medium.

2. A process according to claim 1, wherein said termination step is effected prior to the reaction with said ethylenically unsaturated monomer.

3. A process for preparing an ionizable resinous reaction product that is dispersible in an aqueous ionizing medium which comprises:
    reacting a modified resin, formed by reacting an aromatic 1,2-epoxy diepoxide resin that has aliphatic backbone carbons and a molecular weight of at least 1,000 with a chemical terminating agent for the diepoxide, that reacts with the epoxy groups of the diepoxide resin, substantially to eliminate the epoxide groups of the resin and form the modified resin, with at least one monoethylenically unsaturated addition polymerizable monomer, in the presence of benzoyl peroxide in an amount of at least 3% by weight based on the weight of the monomer, at a temperature in the range from about 110° C. to 130° C. or under equivalent free radical initiating conditions for the reaction including the use of a peroxide initiator, simultaneously to effect polymerization of the monomer through its ethylenic unsaturation and to form graft polymer by a free radical reaction by replacement of hydrogen with addition polymer component grafted to at least some of said backbone carbons, at least some of said monomer units in said addition polymer component comprising ionizable carboxyl groups, the modified resin contributing at least 30% by weight to the resinous reaction product,
    the resinousreaction product obtained containing a sufficient number of ionizable carboxyl groups for establishing the reaction product as a dispersion in an aqueous ionizing medium.

4. A process according to claim 1 or 3, wherein said epoxy resin is a reaction product of bisphenol A and epichlorohydrin and has a molecular weight above 4,000, and contributes from 50% to 90% by weight of said resinous reaction product, based on solids.

5. A process according to claim 3, wherein said ethylenically unsaturated monomer comprises an acrylic acid in an amount sufficient to produce a product having an Acid Number in the range 30 to 220.

6. A process according to claim 5, wherein said monomer comprises methacrylic acid and styrene.

7. A process according to claim 3, wherein carboxyl groups constitute at least 5% by weight of the resinous reaction product.

8. A process according to claim 6, wherein the acid is employed in an amount sufficient to produce a product having an Acid Number in the range from 45 to 150.

9. A process according to claim 8, wherein benzoyl peroxide is employed as the free radical initiator in an amount of ethylenically unsaturated monomer.

10. As a coating composition, an aqueous dispersion comprising an aqueous vehicle, an ionizing agent, and, in dispersed form, the product of claim 1, 3, 7 or 9.

11. A process for reacting a modified aromatic 1,2-epoxy diepoxide resin that has aliphatic backbone carbons and a molecular weight prior to modification of at least 4,000, and that has been reacted with a chemical terminating agent that reacts with the epoxy groups substantially to eliminate the epoxy groups of the resin and form the modified resin, with at least one monoethylenically unsaturated addition polymerizable monomer comprising an acrylic acid, to render the reaction product dispersible in an aqueous ionizing medium, comprising:
    reacting said modified resin with monoethylenically unsaturated addition polymerizable monomer, containing from 10% to 80% by weight thereof of an acrylic acid that would be reactive with the epoxide groups of unmodified epoxy resin, in the presence of an amount of at least 4% of benzoyl peroxide by weight of the monomer of about 110° C. to 130° C., or under equivalent free radical initiating conditions for the reaction including the use of peroxide initiator, simultaneously to effect polymerization of the monomer through its ethylenic unsaturation and to form graft polymer with addition polymer grafted to the modified resin by a carbon-to-carbon bond in place of a hydrogen atom that is bonded thereto in the ungrafted state, the unmodified epoxy contributing at least 50% by weight of the solids of the reaction product;
    the reaction product being acid functional, and the Acid Number being sufficiently high for establishing the reaction product as a dispersion in an aqueous medium in which the product is ionized.

12. A process in accordance with claim 11, wherein the unmodified epoxy resin is a reaction product of bisphenol A with epichlorohydrin, and said terminating agent is bisphenol A.

13. The process of claim 12, that is conducted in a first, water-miscible solvent for the epoxy resin and in a second, water-miscible solvent for the monomer, said solvents being miscible with each other.

14. The process of claim 13, including adding to the reaction product demineralized water and a fugitive base as an ionizing agent, to form an aqueous dispersion of the reaction product.

15. A process according to claim 11, wherein said monomer comprises methacrylic acid, and wherein said Acid Number is in the range of 80 to 90.

16. A process according to claim 15, wherein the benzoyl peroxide is employed in an amount of from 6% to 7% by weight.

17. As a coating composition, an aqueous dispersion comprising an aqueous vehicle, an ionizing agent, and, in dispersed form, the product of the process of claim 11.

18. A process according to claim 1, 3, 11 or 12, wherein said terminating agent is either a phenol or a carboxylic acid, said monomer comprises a mixture of monoethylenically unsaturated monomers at least one of which is an unsaturated carboxylic acid, and wherein the reaction product has an Acid Number in the range from 45 to 150 and comprises a mixture of graft polymer in which an addition polymer component is grafted to, a said aliphatic carbon of the modified epoxy resin by a carbon-to-carbon bond in place of a hydrogen atom that is bonded thereto in the ungrafted state, together with ungrafted unmodified epoxy resin and associatively-formed ungrafted addition polymer formed by the copolymerization of said mixture of monomers, both of said polymer products being carboxylic acid-functional.

19. As a coating composition, an aqueous dispersion comprising an aqueous vehicle, a fugitive basic ionizing agent, and, in dispersed form, the product of the process of claim 18.

20. The process of claim 18, said monomer mixture consisting of a major amount of methacrylic acid, a minor amount of styrene, and a lesser amount of a lower alkyl ester of an acrylic acid, wherein from about 60 parts to about 90 parts of the modified resin are reacted with from about 10 parts to about 40 parts by weight of the mixture of monomers in the presence of from about 6% to about 7% by weight of benzoyl peroxide based on the weight of the mixture of monomers, or under free radical initiating conditions for the reaction using a peroxide initiator other than benzoyl peroxide and an elevated temperature up to about 200° C., the quantity of methacrylic acid being sufficient to impart to the reaction mixture an Acid Number in the range from 80 to 90.

21. A process for forming a resinous reaction mixture that is dispersible in an aqueous ionizing medium comprising:
(a) reacting an aromatic 1,2-epoxy diepoxide resin that has aliphatic backbone carbons and a molecular weight of at least 1,000 with a chemical terminating agent for the resin, that reacts with the epoxy groups of the diepoxide resin, substantially to eliminate the epoxy groups of the resin and to form modified resin; then
(b) reacting with said modified resin a mixture of monoethylenically unsaturated monomers including an acrylic acid, in the presence of about 6.8% by weight of the monomer mixture of benzoyl peroxide at about 110° C. to 130° C., and to effect the simultaneous addition polymerization of the monomers through their ethylenic unsaturation and to form graft polymer with an addition copolymer component grafted to the modified epoxy resin by a carbon-to-carbon bond at a said aliphatic backbone carbon thereof, and then
(c) recovering the reaction mixture, the acid functionality of the reaction mixture being sufficiently high to effect dispersion of the reaction mixture in a basic aqueous medium, the amount of said epoxy resin employed in step (a) being sufficient to contribute at least 30% by weight of said reaction mixture.

22. The process of claim 21 wherein said modified epoxy resin has a molecular weight in the range from about 4,000 to about 10,000, and is present in sufficient quantity to provide from 60% to 90% by weight of the content of the reaction mixture, and wherein the addition polymerizable monomer comprises sufficient addition polymerizable carboxylic acid that the Acid Number of the reaction mixture is in the range from 80 to 90.

23. The process of claim 22, that is conducted in a first, water-miscible solvent for the epoxy resin and in a second, water-miscible solvent for the monomer, said solvents being miscible with each other.

24. The process of claim 23, including adding the reaction product to demineralized water and a fugitive base as an ionizing agent, to form an aqueous dispersion of the reaction product.

25. As a coating composition, an aqueous suspension comprising an aqueous vehicle, a basic ionizing agent that is fugitive upon curing of the composition, and, dispersed in said vehicle, the product of the process of claim 21, 22, or 23.

26. A resinous reaction product that is dispersible in an aqueous ionizing medium comprising ionizable graft polymer substantially free from terminal epoxy groups, said graft polymer having an epoxy resin component that in its ungrafted state consisted of a modified epoxy resin formed by reacting an aromatic 1,2-epoxy diepoxide resin having aliphatic backbone carbons and a molecular weight of at least 350 with a chemical terminating agent for the resin, that reacts with the epoxy groups of the resin, substantially to eliminate the epoxy groups of the resin, and said graft polymer having addition polymer side chain component bonded to at least some of said aliphatic backbone carbons by carbon-to-carbon bonds each of which bonds replaces a hydrogen atom that is bonded to an aliphatic backbone carbon in the ungrafted state, each said side chain comprising polymerized units of monoethylenically unsaturated monomer, the ionizable sites being located in the side chain component, the ionizability being sufficient for establishment of the product as a dispersion in an aqueous medium containing an ionizing agent, said graft polymer being formed by the reaction of said modified epoxy resin and said monoethylenically unsaturated monomer in the presence of at least 3% by benzoyl peroxide by weight based on monomer, or under equivalent free radical initiating conditions for the reaction including the use of a peroxide initiator, at a temperature in the range from about 80° C. to 200° C., and said epoxy resin, as unmodified, contributing at least 10% by weight to said resinous reaction product.

27. The resinous reaction product of claim 26 that also includes ungrafted addition polymer formed from said monomer, and that is ionizable, and some of said modified epoxy resin that is ungrafted.

28. The resinous reaction product of claim 27, wherein the epoxy resin in the ungrafted state is a reaction product of bisphenol A with epichlorohydrin, and has a molecular weight in the range from about 4,000 to about 10,000 and wherein the modified epoxy resin component of the graft polymer and the ungrafted modified epoxy resin together furnish from 60% to 90% by weight of the resinous reaction product.

29. A resinous reaction product according to claim 28, wherein said addition polymer and said addition polymer component of said graft polymer are carboxylic acid-functional.

30. A resinous reaction product according to claim 29, wherein the Acid Number (N.V.) of the product is in the range from 45 to 150, and wherein the ionizability is sufficiently high to establish and to maintain the resinous reaction product as a stable dispersion in an aqueous medium containing a basic ionizing agent.

31. A water-based coating composition comprising in percentages by weight of the composition:
 (a) from 60% to 90% of a liquid vehicle comprising an ionizing agent, and
 (b) from 10% to 40% of solids comprising the ionized resinous reaction product of claim 27, 28, or 30, said liquid vehicle consisting of up to 35% by weight of the composition of organic solvent.

32. A water-based coating composition according to claim 31 wherein the solids comprise said resinous reaction product in an amount of from 6% to 39.9% by weight of the composition, and an aminoplast cross-linking agent in an amount of from 0.1% to 16% by weight of the composition.

33. A sprayable water-based coating composition according to claim 32 wherein the liquid vehicle comprises 70% to 90% of the composition and said resinous reaction product comprises 9% to 29% of the composition, by weight.

34. A water-based coating composition according to claim 33 wherein said cross-linking resin is present in an amount from 1% to 10% of the composition, and wherein said composition comprises from 2% to 6% by weight of a fugitive base that ionizes the resinous reaction product.

35. As a coating composition an aqueous dispersion comprising an aqueous vehicle, an ionizing agent for ionizable solids, said agent being fugitive under curing conditions for the coating, and, dispersed in said vehicle, the resinous reaction product of claim 26.

36. A dispersion according to claim 35 wherein said modified epoxy resin is terminated with a secondary amine.

37. A blend of polymeric ingredients that is dispersible in a basic aqueous ionizing medium, said blend being the reaction product of:
 (a) from about 30 to 90 parts by weight of a modified aromatic 1,2-epoxy diepoxide resin that has an average unmodified molecular weight of at least about 1,000, and aliphatic backbone carbons that have one or two carbons bonded thereto, and that is modified by being chemically terminated through reaction with a phenol or a carboxylic acid substantially to eliminate its epoxy groups, and
 (b) from about 10 to about 70 parts by weight of at least one addition polymerizable monoethylenically unsaturated monomer comprising an acrylic acid;
 (c) in the presence of at least 3% of benzoyl peroxide by weight of said monomer and at a temperature in the range from about 110° C. to about 130° C., or under equivalent free radical initiating conditions for the reaction using a peroxide initiator, at about 30° C. to about 200° C., the amount of initiator being sufficient simultaneously to effect addition polymerization of the monomer through its ethylenic unsaturation and to form graft polymer with addition polymer grated to the modified epoxy resin by carbon-to-carbon bonding, each of which bonds replaces a hydrogen atom that is bonded to a said aliphatic backbone carbon in the ungrafted state; said reaction product including graft polymer in which the modified epoxy resin has addition polymer grafted thereto, ungrafted associatively-formed addition polymer polymerized through its ethylenic unsaturation, and ungrafted epoxy resin, said reaction product having an Acid Number in the range from 45 to 150, and said graft polymer and associatively-formed addition polymer being acid-functional,
 the Acid Number being sufficiently high for establishing said reaction product as a dispersion in a basic aqueous medium in which said reaction product is ionized.

38. A blend of polymeric ingredients according to claim 37, said blend being the reaction product of:
 (a) from about 60 to about 90 parts by weight of said modified aromatic epoxy resin that has an average unmodified molecular weight of at least 4,000, and
 (b) from about 10 to about 40 parts by weight of said blend of said monomer, said monomer being a mixture of more ethylenically unsaturated monomers.

39. The polymeric blend of claim 38 wherein the mixture of ethylenically unsaturated monomers includes ethylenically unsaturated carboxylic acid in sufficient quantity that the Acid Number of the polymeric blend is in the range from 80 to 90 and wherein the addition polymerization of said monomers is conducted in the presence of more than 6% of benzoyl peroxide by weight of the monomer mixture.

40. As a coating composition, an aqueous dispersion comprising an aqueous vehicle, a basic ionizing agent that is fugitive under curing conditions for the composition, and the ionized blend of polymeric ingredients of claim 38 or 39.

41. The polymeric blend of claim 38 wherein said mixture of addition polymerizable monomers comprises a major amount of an acrylic acid and a minor amount of styrene, the quantity of the acrylic acid being sufficient to impart to the blend an Acid Number of rom 80 to 90, and wherein the amount of benzoyl peroxide used to produce said reaction product is from about 6% to about 7% by weight of the monomer mixture at from about 110° C. to about 130° C.

42. The polymeric blend of claim 38, the reaction being conducted in the presence of about 6.8% of benzoyl peroxide by weight of the monomer mixture, at a temperature in the range from about 110° C. to about 130° C., and wherein the monomer mixture comprises methacrylic acid, styrene, and a lower alkyl acrylate or methacrylate, and the Acid Number of the blend is 80 to 90.

43. As a coating composition, an aqueous dispersion comprising an aqueous vehicle, a basic ionizing agent that is fugitive under curing conditions for the composition, and the ionized polymeric blend of claim 41 or 42.

44. An associatively-formed resinous blend that is dispersible in an aqueous ionizing medium comprising:
 (a) ionizable graft polymer;
 (b) ionizable, ungrafted addition polymer; and
 (c) ungrafted modified epoxy resin;

said modified epoxy resin being the reaction product of an initial aromatic 1,2-epoxy diepoxide resin having a molecular weight above 1,000 and a chemical terminating agent that is a phenol or a carboxylic acid and that reacts with the epoxy groups of the resin, to eliminate them;

said modified epoxy resin having aliphatic backbone carbons including some carbon atoms that have one or two hydrogens bonded thereto;

said graft polymer having a backbone component of said modified epoxy resin and, grafted thereto, addition polymer side chain component, said grafting being to at least some of said aliphatic carbons by carbon-to-carbon bonds each of which replaces a hydrogen atom that is bonded to an aliphatic backbone carbon in the ungrafted state;

said graft polymer being formed by the reaction of said modified epoxy resin and at least one monoethylenically unsaturated monomer in the presence of at least 3% of benzoyl peroxide by weight based on monomer at a temperature in the range from 110° C. to 130° C., or under equivalent free radical initiating conditions for the reaction including the use of a peroxide initiator, at a temperature in the range from about 30° C. to about 200° C., the modified epoxy resin component of said graft polymer and the ungrafted modified epoxy resin together constituting from 30% to 90% of said blend by weight;

the ungrafted addition polymer and grafted addition polymer component being formed by polymerization through monoethylenic unsaturation of monomer comprising an acrylic acid, both said addition polymer and said addition polymer component being acid functional, the Acid Number of the blend being sufficiently high for establishing the reaction product mixture as a dispersion in a basic aqueous medium.

45. The resinous blend of claim 44 wherein said epoxy resin in the unmodified state has a molecular weight of at least 4,000, the modified epoxy resin component and the ungrafted modified epoxy resin together constitute from 60% to 90% of the blend, and the Acid Number (N.V.) of the blend is from 45 to 150.

46. A water-based coating composition comprising in percentages by weight of the composition:
(a) from 60% to 90% of a liquid vehicle,
(b) a basic ionizing agent that is fugitive upon curing of the composition, and
(c) from 10% to 40% of solids comprising the ionized resinous blend of claim 45, said liquid vehicle comprising up to 35% by weight of the composition of organic solvent and the balance water.

47. A water-based coating composition comprising, in percentages by weight of the composition,
(a) from about 60% to about 90% of a liquid vehicle and
(b) from about 10% to about 40% by weight of the composition of solids that are dispersed in the liquid vehicle;

said solids comprising a resinous blend according to claim 45 in an amount of from 6% to 39.9% of said composition and an aminoplast cross-linking agent in an amount of from 0.1% to 16% of said composition;

said liquid vehicle comprising of from 6% to 35% by weight of the composition of organic solvent, and from 25% to 80% of the composition of water, together with an ionizing agent producing ionization of said polymers in said resinous blend that is sufficient to establish said blend in the aqueous vehicle as a dispersion.

48. A water-based, sprayable coating composition according to claim 47, for use for application and curing as an internal sanitary liner for metal containers for beverages, comprising, in percentages by weight of the composition,
(a) from about 70% to about 90% of said liquid vehicle,
(b) from about 9% to 29% of said acidic resinous blend solids dispersed in said liquid vehicle,
(c) from about 1% to 10% of said aminoplast as the cross-linking agent, and
(d) from about 2% to about 6% of a fugitive base as said ionizing agent that ionizes said acidic resinous blend;

said resinous blend solids being the product of an initial reaction mixture of said modified epoxy resin and said monoethylenically unsaturated monomer in the presence of an amount of benzoyl peroxide greater than 6% by weight of said monomer, reacted at 110° C. to 130° C., said acrylic acid being present in the initial reaction mixture in sufficient quantity to impart an Acid Number to the resinous reaction product in the range from about 80 to 90.

* * * * *